United States Patent [19]
Qiu et al.

[11] Patent Number: 6,085,002
[45] Date of Patent: Jul. 4, 2000

[54] METHODS TO FABRICATE DENSE WAVELENGTH DIVISION MULTIPLEXERS

[76] Inventors: Cindy Xing Qiu, 6215 Bienville St., Brossard, Quebec, Canada, J4Z 1W2; Yi-Chi Shih, 2216 Thorley Pl., Palos Verdes Estate, Calif. 90274; Lap Sum Yip, 57 Granville Blvd., Hampstead, Quebec, Canada, H3X 3B7

[21] Appl. No.: 09/039,431

[22] Filed: Mar. 16, 1998

[30]  Foreign Application Priority Data

Mar. 14, 1997 [CA]  Canada ................................ 2199996

[51] Int. Cl.[7] ........................................................... G02B 6/26
[52] U.S. Cl. ................................ 385/52; 385/24; 359/885
[58] Field of Search ................................. 385/15, 24, 27, 385/31, 39, 42, 49, 50, 129–132, 55, 65, 70–74, 52; 359/885, 887, 888, 889, 891

[56]  References Cited

U.S. PATENT DOCUMENTS

| | | | |
|---|---|---|---|
| 4,439,005 | 3/1984 | Winzer | 350/96.15 |
| 5,144,498 | 9/1992 | Vincent | 359/885 |
| 5,706,371 | 1/1998 | Pan | 385/11 |
| 5,783,115 | 7/1998 | Bilkadi et al. | 252/582 |

FOREIGN PATENT DOCUMENTS 61-282803  12/1986  Japan .

*Primary Examiner*—John D. Lee
*Assistant Examiner*—Michelle R. Connelly-Cushwa

[57]  ABSTRACT

Methods for the fabrication of dense wavelength division multiplexors (DWDM) are disclosed. In one embodiment, an array of micro membranes and an array of cavities for optical fibers are etched in a substrate. The distance between major surface of adjacent micro membranes is controlled during the etching step. Multilayer narrow band pass filters are then deposited on all micro membranes simultaneously by vacuum deposition methods. Due to the controlled separation between adjacent micro membranes, the central wavelength of transmission either increases or decreases from one membrane to another. In another embodiment, a micro machined structure containing a plurality of cavities and a slot for variable narrow band pass filter is fabricated. The variable narrow band pass filter is aligned with respect to the optical fibers to obtain a WDM.

16 Claims, 22 Drawing Sheets

METHODS TO FABRICATE DENSE WAVELENGTH DIVISION MULTIPLEXERS

BACKGROUND OF THE INVENTION

1. Field of the Invention

The invention relates generally to methods to fabricate arrays of optical filters. More specifically, the invention relates to methods to fabricate arrays of narrow band pass filters for optical signal processing and optical communications.

2. Description of the Prior Art

In modern optical systems for signal processing or optical communications, filters are often used in order to select photons with the desired energies or light of the desired wavelengths. The central wavelengths of transmission and band widths of such filters are dependent upon the applications. For fiber optic communications, the desired wavelengths of light are within a band where the attenuation of light in the fibers is low. One of the important wavelength bands is from 1500 nm to 1560 nm. Certain systems involving optical fibers also operate at wavelengths in the range from 1240 nm to 1340 nm. In each of the above wavelength bands, it is desired to transmit more than one beam of light of different wavelengths.

A light beam at a particular wavelength is considered one channel. In practice, a light beam for one channel spreads over a very narrow range of wavelength. For high bit rate signal processing and optical communications, it is desirable to transmit as many channels as possible in a given band wavelengths. This is because the rate of data transmission when an optical fiber is used is directly proportional to the number of channels or wavelengths. To receive the signals carried by the fiber, it is necessary to select light in a given narrow wavelength range. This can be done by allowing light of a given narrow range to transmit through a filter. It can also be achieved by allowing light at wavelengths other than the narrow wavelength range to transmit through a filter and light at wavelengths within the given narrow range to reflect from the filter. The transmitted or reflected light within the narrow wavelength range is then processed and detected.

There are several methods which can be used to construct filters to separate light of different wavelengths. One of the methods is to use multilayer thin film optical filters. The principles of multilayer thin film optical filters are based on light interference and can be found in many textbooks (for example in Thin Films for Optical Systems edited by F. R. Flory, published by Marcel Dekker Inc., 1995). One of the possible structures is to deposit alternating thin film layers of two materials with different refractive indices. Each layer has a thickness of $t_i = \Omega/4n_i$, where $\Omega$ is the wavelength (in free space) of light to select or to transmit, $n_i$ is the refractive index of the material at the given wavelength. The transmission band width is determined by the number of thin film layers deposited. It should be noted that multilayer structures involving more than two materials may also be used.

Using this technology, optical filters with a narrow pass band (less than 1 nanometer, nm) have been fabricated and used in many optical devices and systems. The other way to separate light of different wavelengths is to use gratings. The gratings are fabricated on a flat substrate. When light is incident on the gratings, light of different wavelengths is diffracted in different directions. The spacing of adjacent grating grids is determined by the wavelengths of the light to be diffracted. The resolution of the grating devices can be made to be smaller than 1 nm. More recently, a technology has been developed and used to fabricate grating devices in an optical fiber directly. Such devices are called fiber gratings. In this method, a specially designed mask is placed on a fiber. Ultraviolet light is then allowed to go through the mask and incident onto the fiber. The refractive indices of the illuminated regions are altered to form fiber sections with periodic refractive index variation. When light is incident on the core of one end of the fiber, light within a specific wavelength range is reflected. The rest of the light is allowed to transmit through the fiber. Using this method, fiber gratings with very narrow reflection band have been fabricated and used.

As described before, in order to increase the data transmission rate in optical signal processing or optical communication systems, the data must be carried by light at different wavelengths concurrently in a fiber. The separation of light of different wavelengths is the most critical part in such applications. The device used to separate light of different wavelengths is called a wavelength division multiplexer (WDM). In some literatures, the device used to separate light of different wavelengths is also called a wavelength division demultiplexer. When the separation of wavelength $\delta\Omega$, of light beams propagating in a fiber is of the order of 0.5 to 5 nm, the device used for the separation is called a dense wavelength division multiplexer (DWDM). Conventional WDMs or DWDMs are constructed by combining several discrete filters, each with one specific transmission or one central reflection wavelength. For WDMs or DWDMs with thin film filters, each filter has to be tested and installed in a holder and aligned with input and output fibers. The testing, installing and alignment are rather time consuming. Further, the final WDMs or DWDMs may be quite bulky and quite expensive. From the above comments, it is evident that there is a need to provide an improved method to fabricate WDMs or DWDMs for optical signal processing and optical communication systems. The WDMs or DWDMs fabricated using the methods provided in this patent are suitable for optical signal processing systems and optical communication systems.

SUMMARY OF THE INVENTION

The present invention provides an array of miniature narrow band pass filters and methods to fabricate the same. In one embodiment, the array which consists of at least one miniature narrow band filter is fabricated by first micro machining a silicon (Si) wafer. After the micro machining, a plurality of miniature membranes and cavities are formed. Each membrane is associated with two cavities, one on each side. The long axis of each cavity coincides with the normal passing through the center of the membrane. The thickness of the membranes may be in a range from a few micrometers to a few tens of micrometers. Hence, the miniature membranes in this invention are sufficiently strong in their mechanical properties to serve as rigid supports for miniature narrow band pass filters. The mask used to achieve the lithography for the micro machining is designed so that the main surface of each membrane is parallel to the main surfaces of the other membranes. The distance between adjacent membranes is selected so that the thicknesses of thin films vary from each membrane to the others. The substrate containing the membranes and cavities is then introduced into a vacuum chamber for deposition of multilayer thin film narrow band filters. The substrate is oriented so that one of the two main surfaces of each membrane is substantially perpendicular to the plane of and directly over the deposition source.

With the above arrangement, the distance between the deposition source and the main surface facing the source either increases or decreases from one membrane to the other. The thickness of each layer of the multilayers either decreases or increases from corresponding membrane to the other. Since the increase or decrease of the thicknesses are systemic from one membrane to another for both high index layers and low index layers, narrow band filters are obtained on all of the membranes. More importantly, due to the systematic increase or decrease in the thicknesses of the layers, the central wavelength of transmission systematically shifts from one value to another. For instance, when the thicknesses of the layers increase from one membrane to another due to a decrease in the distance from the main surface to the deposition source, the central wavelength of transmission from the membrane to another also increases. Hence, the central wavelength of transmission of the narrow band pass filter associated with each membrane is controlled by the distance between the main surface of the membrane and the deposition source. Each membrane is associated with two cavities, one on each side. The long axis of each cavity coincides with a normal passing through the center of the membrane.

The purpose of having two cavities for each membrane is to accommodate the two optical fibers. The fiber facing the membrane with the deposited multilayer narrow band pass filter will receive light from the source and will illuminate the filter, whereas the other fiber will deliver the filtered light to the load, which may be an optical detector. Hence, one of the main features of the present invention is the structure of an integrated array of miniature narrow band pass filters with central wavelength of transmission controlled by the relative position of the membranes. One of the advantages of the present integrated filter array is that the optical fiber that delivers the incident light to the miniature narrow band pass filter and the optical fiber that receives the filtered light can be installed and self-aligned with respect to each other and with respect to the filter, through the precisely machined micro cavities. The other advantage is that the integrated filter arrays can be fabricated using the very well established semiconductor fabrication technology. Yet another advantage is that the dimensions of the integrated filter arrays can be made very small. The integrated filter arrays according to this invention are suitable for WDMs or DWDMs applications in optical signal processing systems and optical communication systems.

Included in this invention is a method for manufacturing an integrated array of miniature narrow band pass filters for multi-channel optical signal processing and optical communications within a range of optical wavelengths comprising the steps of:

forming a plurality of micro membranes and a plurality of cavities on a substrate having one reference edge, with at least one cavity located at one side and at least one cavity located on opposite side of each of said membranes, distance between main surface of each membrane and edge of first membrane increases in one direction, mounting said substrate in a vacuum deposition system having a deposition source with main surface of each membrane perpendicular to normal line of said deposition source, depositing a multilayer narrow band pass filter on said main surface of each membrane with the central wavelength of transmission varies from one filter to another, difference between adjacent filters defines a wavelength spacing, each membrane and associated cavities forming an optical channel, mounting a top cover on said substrate, inserting an optical fiber in each of said cavities.

In another embodiment, a WDM or DWDM is fabricated by installing a narrow band pass thin film filter in a micro machined slot. Cavities to accommodate optical fibers which deliver incident light and optical fibers which receive the filtered light are created during the same micro machining process. The narrow band pass thin film filter is fabricated so that the central wavelength of transmission is a function of position. The exact locations of the cavities to accommodate the optical fibers are selected so that when the narrow band pass filter is installed, it is aligned with all of the fibers simultaneously. When beams of light are incident on the optical fibers which deliver the incident beams to the filter, beams of different wavelengths will be allowed to pass through different parts of the filter and illuminate the different optical fibers which receive the filtered light. Hence, the above described device is suitable for use as a WDM or DWDM for optical signal processing systems or optical communication systems. Using the method provided in the present invention, compact WDMs or DWDMs may be manufactured.

Hence, also included in this invention is a method for manufacturing a multi channel integrated array with variable narrow band pass filters for optical signal processing and optical communications within a range of optical wavelengths comprising steps of:

forming a variable narrow band pass filter on a substrate with central wavelength of transmission increases from a first wavelength value to another value in one direction, forming an approximately rectangular slot to accommodate said variable narrow band pass filter and a plurality of cavities on a substrate having one reference edge, with at least one cavity located on one side and at least one cavity located on the opposite side of said slot, positioning said variable narrow band pass filter in the slot of said substrate, mounting a top cover on said substrate, inserting an optical fiber in each of said cavities, sending a monochromatic light beam at said first wavelength to a fiber in a first cavity, adjusting position of said variable narrow band pass filter until optical output from another fiber in said first cavity is maximum, applying epoxy at two ends of said narrow band pass filter to fix its position with respect to said substrate.

In yet another embodiment, a WDM or DWDM is fabricated by installing a plurality miniature narrow band pass filters in slots of a micro machined substrate. Central wavelengths of transmission are controlled separately during the deposition of multi-layer thin films on transparent substrates. Cavities to accommodate optical fibers which deliver incident light and optical fibers which receive the filtered light are created during the same micro machining process for the slots. The exact locations of the cavities to accommodate the optical fibers are selected so that when the miniature narrow band pass filters are installed, they are aligned with the corresponding fibers simultaneously. When beams of light are incident on the optical fibers which deliver the incident beams to the filters, beams of different wavelengths will be allowed to pass through different miniature narrow band pass filters and illuminate the different optical fibers which receive the filtered light. Hence, the above described device is also suitable for use as a WDM or DWDM for optical signal processing systems or optical communication systems. Using the method provided in the present invention, compact WDMs or DWDMs may be manufactured.

One object of the present invention is to provide a structure with multiple membranes for integrated arrays of miniature narrow band pass filters.

Another object of the present invention is to provide a method to fabricate integrated arrays of narrow band pass filters.

Yet another object of the present invention is to provide a method to control the variation of central wavelengths of transmission for integrated miniature narrow band pass filters.

Still another object of the present invention is to provide a method to fabricate WDMs or DWDMs using a thin film optical filter with the central wavelengths of transmission varying with position.

Still an object of the present invention is to provide a method to fabricate WDMs or DWDMs using a plurality of miniature narrow band pass filters with different central wavelengths of transmission in a micromachined substrate.

Figure 1A:
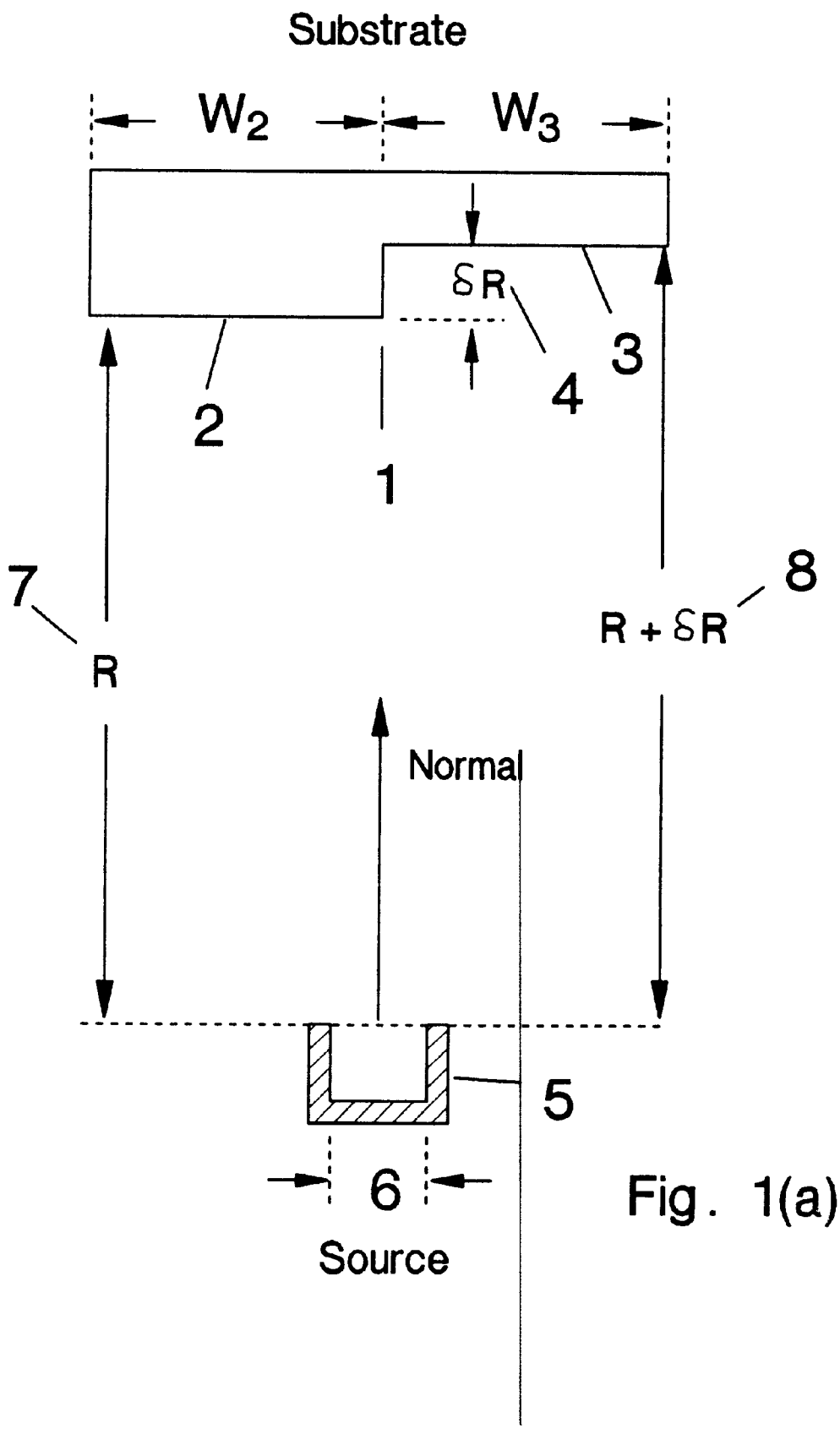
FIG. 1 (a) is a schematic view of the deposition system showing the distances between the deposition source and the two regions of the substrate, and (b) is a diagram showing the variation of transmission peak of the two regions.

While the invention will be described in conjunction with the illustrated embodiments, it should be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the drawings, similar features have been given similar reference numerals.

Thin film optical filters are normally prepared by vacuum deposition methods in a vacuum chamber at a very low base pressure. At a low pressure, the mean free path of the molecules, atoms or ions of the source materials can be much longer than the dimensions of the vacuum chamber. When thin films are deposited at a low pressure on a flat substrate and with a relatively small deposition source area, the thickness of film deposited is determined by the distance between the source and the substrate. Refer now to FIG. 1(a) where there is shown a cross-sectional view of a substrate with a step (1) which separates the substrate into two regions (2, 3). The height of the step is δR (4). When the substrate is placed in a vacuum system with an evaporation source (5) of a diameter (6) which is much smaller than the distance R (7) between region (2) and the source (5), the distance between the source and region (3) is R+δR (8).

To simplify the description, when the width of region (2), $W_2$, and the width of region (3), $W_3$, are much smaller than R, the distance between any points on region (2) and the evaporation source may be considered to be equal R, whereas the distance between any points on region (3) and the evaporation source may be considered to be equal R+δR. To further simplify the description, the evaporation source may be considered as a point source. When a fixed amount of a material is evaporated from a point source, the thickness, $t_R$, of film deposited on region (2) located at a distance R from the source is:

$$t_R = m/[D*2_\pi R^2] \quad [1]$$

Here m is the total mass evaporated from the point source, D is the density of the material. Whereas the thickness, $t_{R+\delta R}$, of film deposited on region (3) which is located at a distance R+δR from the source is:

$$t_{R+\delta R} = m/[D*2_\pi(R+\delta R)^2] \quad [2]$$

The difference of the thicknesses in the two regions is:

$$\delta t = t_R - t_{R+\delta R} \quad [3]$$
$$= m/[D*2_\pi R^2] - m/[D*2_\pi(R+\delta R)^2]$$

When $\delta R << R$, Equation [3] can be simplified as:

$$\delta t = [2\delta R/R]*t_R \quad [4]$$

From equation [4], it is evident that the difference in film thickness for the two regions, $\delta t$, can be controlled by controlling the height of the step, $\delta R$.

In practical experiments, the source used may not behave completely like a point source. However, when the dimensions of the source are much smaller than R, then the general relation between $\delta t$ and $\delta R$ will remain. As $\delta R$ between region (2) and region (3) increases, $\delta t$ increases. The actual relation may be obtained by preparing a set of thin film samples for calibration purposes.

The relationship of the increase in thickness $\delta t$ as the $\delta R$ increases is used to fabricate arrays of filters with controlled central wavelength of transmission. In the subsequent description, examples are given using conventional quarter wavelength multilayer narrow band pass filters. It is understood that for those skilled in the art, thin film design configurations other than the quarter wavelength design may be used. These configurations may include designs which give flat top transmission band and Farby-Perrot cavities.

Consider the fabrication of thin film narrow band pass filters with the following structures: SLHLHLH - - - LHA or S(HLHLHaLHLHLH)L(HLHLHbLHLHLH)L (HLHLHaLHLHLH)A. Here S designates the substrate used to support the multilayer filter, L designates the low index layers, H designates the high index layers, A is air, a is an integer (=2 for example) and b is another integer (=8 for example). Although the following description is made using the above example, it should be noted that there are many varieties which may be used to construct narrow band pass filters. In the above structure, the thicknesses of all H layers are preferably the same and equal $\Omega/[4n_H]$ whereas thicknesses of all L layers are controlled so as to be the same and equal $\Omega/[4n_L]$. Whereas the thicknesses of layers indicated by aL and bL are $a\Omega/[4n_L]$ and $b\Omega/[4n_L]$ respectively. Here, $\Omega$ is the central wavelength for the transmission of the filter. Transmission band width of the filter $\delta\Omega$, which is defined as a range of wavelength for transmission greater than 50% of the peak value, is determined by the total number of layers and the index ratio, $n_H/n_L$.

Referring back to FIG. 1(a), when the above SLHLHLH - - - LHA or S(HLHLHaLHLHLH)L(HLHLHbLHLHLH) L(HLHLHaLHLHLH)A thin films are deposited simultaneously on region (2) and region (3) and when the thicknesses of all the H layers on region (2), $t_{RH}$, are maintained at $\Omega_2/[4n_H]$ and the thicknesses of all the L layers on region (2), $t_{RL}$, are maintained at $\Omega_2/[4n_L]$, then the central wavelength of transmission of the multilayer on region (2) is $\Omega_2$.

Figure 1B:
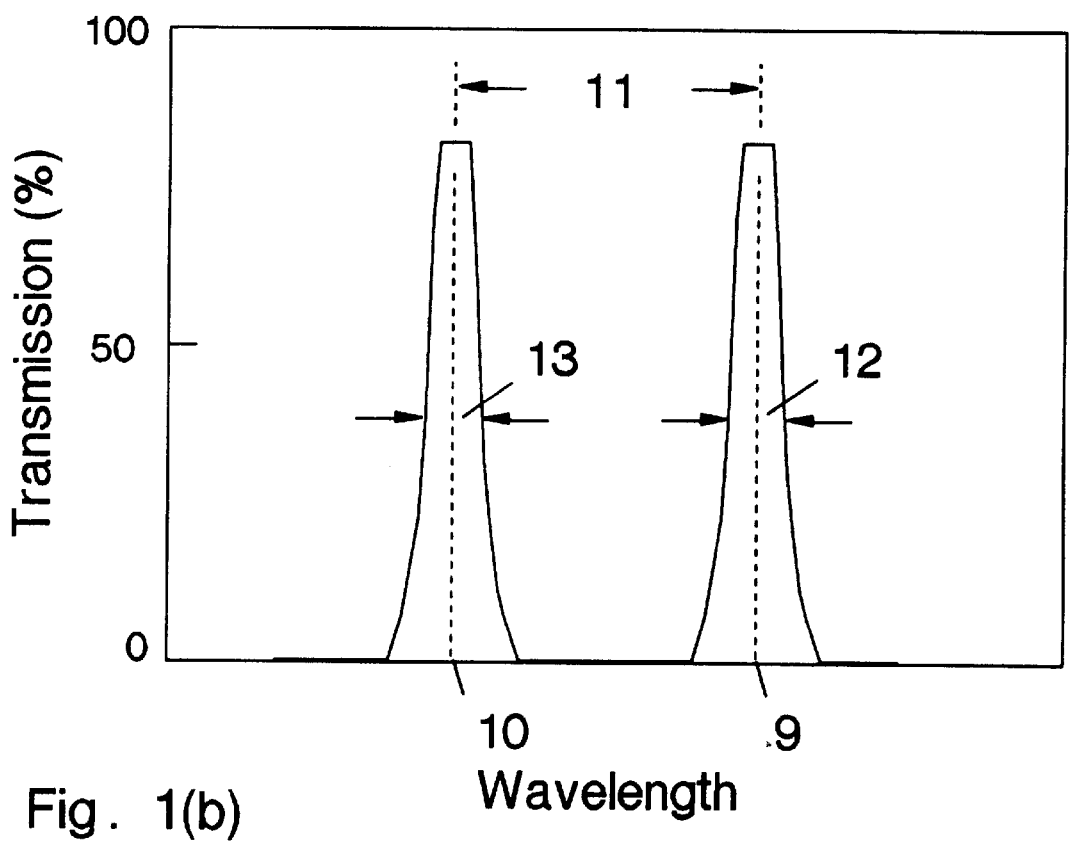

During the deposition of either the high index layers or the low index layers, thin film materials are also depositied on region (3). In region (3), the thicknesses of the high index layers, $t_{(R+\delta R)H}$, are equal to $\Omega_3/[4n_H]$ and the thicknesses of all L layers on region (3), $t_{(R+\delta R)L}$, are equal to $\Omega_3/[4n_L]$. As shown in FIG. 1(b), when the deposition of the multilayer narrow band pass filters is complete, the central wavelength of transmission in region (2) is $\Omega_2$ ((9) in FIG. 1(b)), whereas the central wavelength of transmission in region (3) is $\Omega_3$ ((10) in FIG. 1(b)). The difference in the central wavelengths between region (2) and region (3), $\delta\Omega$((11) in FIG. 1(b)), is thus determined by the value of $\delta R/R$ as indicated in equation [4]. Furthermore, the transmission band width (12) of the filter in region (2), which is defined as the range of wavelength for transmission greater than 50% of the peak value, is approximately equal to the transmission band width (13) of the filter in region (3).

Figure 2:
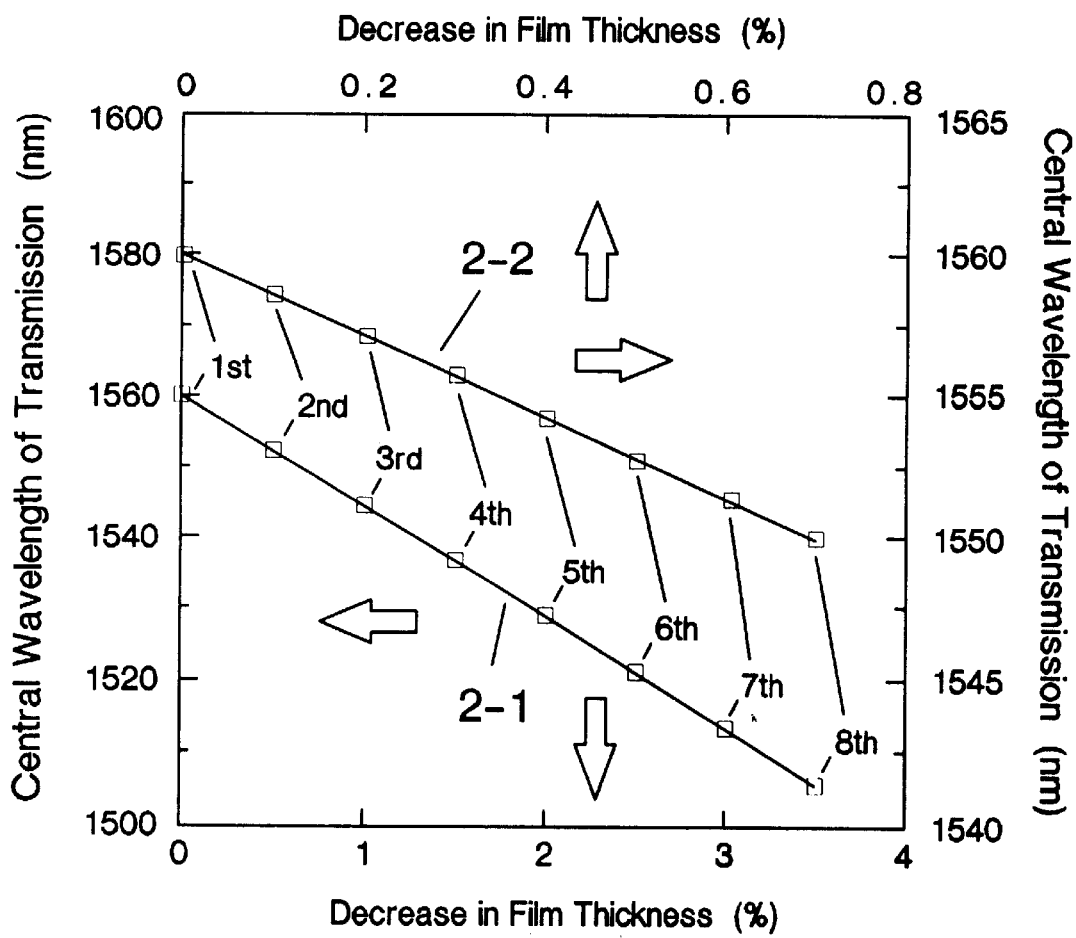
FIG. 2 shows the variation of peak wavelength in the ranges from 1560 nm to 1500 nm and from 1560 nm to 1550 nm with the percentage decrease of thickness in the multi-layer narrow band pass filters.

To fabricate an array of miniature narrow band pass filters with central wavelengths within a range from 1500 to 1560 nm, the required change of thickness for both high index layers and low index layers can be determined using the curve shown in FIG. 2. In FIG. 2, curve (2-1), the central wavelength of the first filter element which has the largest thickness: $t_{H1}$ and $t_{L1}$ is selected to be equal to 1560 nm. All other filter elements have thicknesses, $t_{Hi}$ and $t_{Li}$ (i>1), which are respectively smaller than $t_{H1}$ and $t_{L1}$. The progressively smaller $t_{Hi}$ and $t_{Li}$ are obtained by progressively increasing the distance between the ith membrane and the first membrane (i=1). It should be noted that values of central wavelength of transmission for the first filter element other than 1560 nm may be selected for different WDMs. Furthermore, it is noted that the transmission band width of the filter, $\delta\Omega$, which is defined as a range of wavelength for transmission of 50% or more is independent of the shift of the central wavelength of transmission.

To fabricate an array of miniature narrow band pass filters with central wavelengths within a reduced range from 1550 to 1560 nm, the required change of thickness for both high index layers and low index layers is smaller. In FIG. 2, curve (2-2), the central wavelength of the first filter element which has the largest thickness: $t_{H1}$ and $t_{L1}$ is selected to be equal to 1560 nm. All other filter elements have thicknesses, $t_{Hi}$ and $t_{Li}$ (i>1), which are respectively smaller than $t_{H1}$ and $t_{L1}$. The progressively smaller $t_{Hi}$ and $t_{Li}$ are obtained by progressively increasing the distance between the ith membrane and the first membrane (i=1).

For the results shown in FIG. 2, the thickness values of $t_{H1}$ and $t_{L1}$ are selected so that the central wavelength for the transmission of the first filter on the first membrane is equal to 1560 nm. It may be seen that the central wavelength can be conveniently controlled within the range 1505 nm to 1560 nm (curve (2-1)) by controlling the difference in thicknesses (for both the high index and low index layers) $\delta t_{Hi}$ and $\delta t_{Li}$, within 3.5% of $t_{H1}$ and $t_{L1}$. According to equation [4], the corresponding change in distance $\delta R$ is within 1.75% of R. Here R is the distance between the deposition source and the first membrane for the first filter (7 in FIG. 1(a)). For the wavelength range from 1550 nm to 1560 nm (curve (2-2)) the difference in thicknesses (for both the high index and low index layers) between the layers on the ith filter (i>2) and the corresponding layers on the first filter, $\delta t_{Hi}$ and $\delta t_{Li}$, is not more than 0.7% of $t_{H1}$ and $t_{L1}$. According to equation [4], the corresponding change in distance $\delta R$ is within 0.35% of R.

According to FIG. 2, to fabricate an array of miniature narrow band pass filters with a spacing of central wavelength, $\delta\Omega$, of two consecutive channels of 2 nm, a change of about 0.13% in thicknesses for both the high index and low index layers is required. This 0.13% change in thicknesses can be obtained by changing the distance between the membranes for the two channels by 0.065% R. If the value of R is selected to be equal to 30 cm during the thin film deposition, the corresponding change in distance is 195 $\mu$m. This distance can be easily achieved by the very well developed photolithography process and the micro machining process. To fabricate an integrated miniature narrow band pass filter array to cover the 1520 nm to 1560 nm wavelength range with a wavelength spacing of 1 nm, the total number of channels or filters is 41. The distance between the first membrane and the 41st membrane is 6000 μm or 6 mm. The integrated filter array can be conveniently fabricated using a substrate with dimensions of about 2 cm×2 cm×1 mm.

When an array with the number of channels less than 41 is fabricated, the distance between the first membrane and the last membrane will be less than 6 mm. Hence, it can be fabricated on a substrate with dimensions which are less than 2 cm×2 cm×1 mm. The total number of channels or filters which can be integrated in the same substrate can be increased by decreasing the band width of each channel and reducing the wavelength spacing. The band width can be decreased by increasing the ratio between the refractive index of the high index layers and the refractive index of the low index layers.

Figure 3:
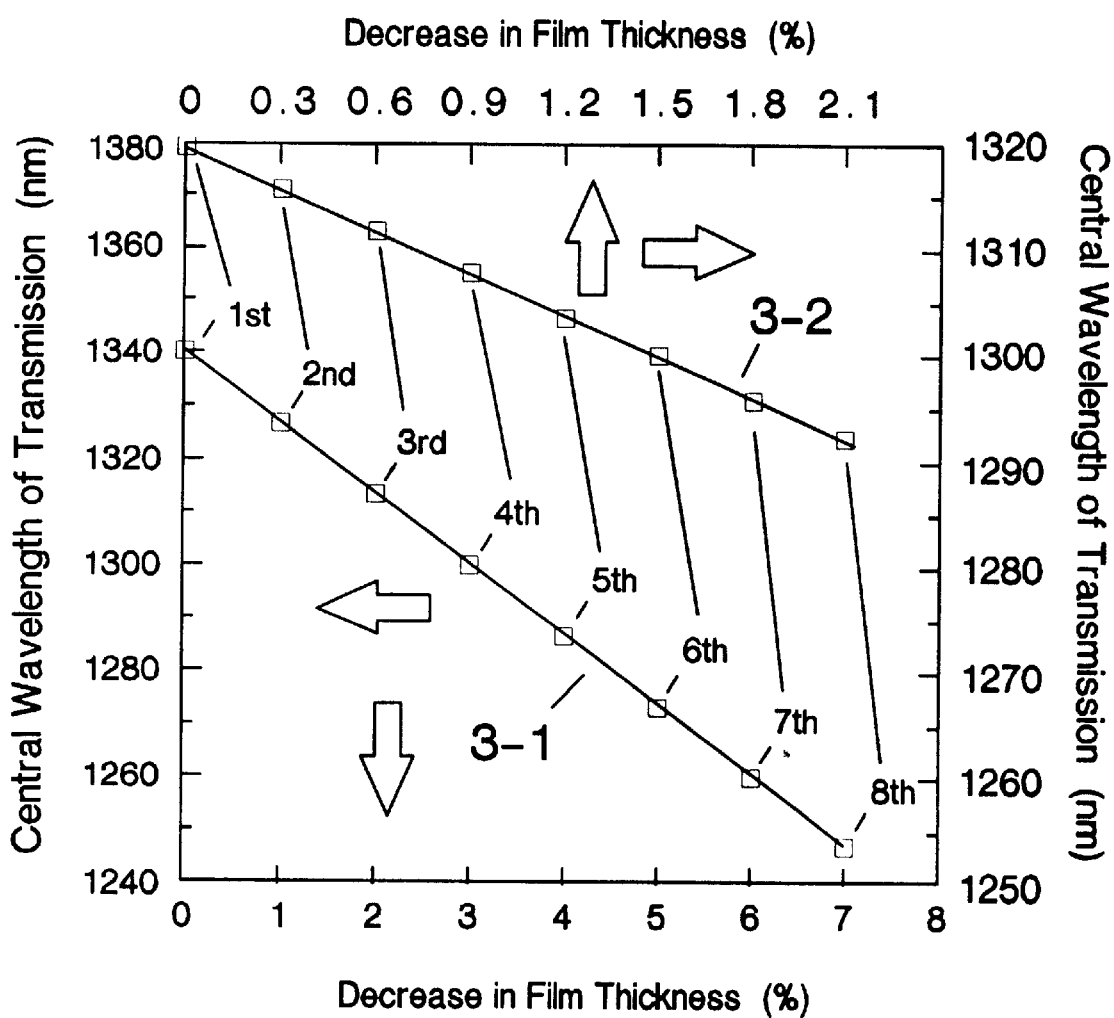
FIG. 3 shows the variation of peak wavelength in the ranges from 1340 nm to 1240 nm and from 1320 nm to 1293 nm with the percentage decrease of thickness in the multi-layer narrow band pass filters.

The variation of central wavelength with the variation of the thicknesses for both the high index and low index layers in another important wavelength range, 1250 nm to 1340 nm, is shown in FIG. 3. It is noted again that the central wavelength can be conveniently maintained in the range from 1250 nm to 1340 nm (curve (3-1)) by controlling the difference in thicknesses (for both the high index and low index layers). The corresponding thickness difference required between the first membrane and the last membrane is: $\delta t_{Hi}/t_{H1}=7\%$ and $\delta t_{Li}/t_{L1}=7\%$. According to equation [4], the corresponding change in distance, δR, is within 3.5% of R. Here R is the distance between the deposition source and the first membrane of the first filter. In FIG. 3, curve (3-2) shows the variation of central wavelength in the range from 1290 nm to 1320 nm with the decrease in the film thickness. The corresponding thickness difference required between the first membrane and the last membrane is: $\delta t_{Hi}/t_{H1}=2.1\%$ and $\delta t_{Li}/t_{L1}=2.1\%$. According to equation [4], the corresponding change in distance, δR, is within 1.05% of R.

It should be noted that values of central wavelength of transmission for the first filter element other than 1340 nm may be selected for different WDMs. Furthermore, it is noted that the transmission band width of the filter, δΩ, which is defined as a range of wavelength for transmission of 50% or more is independent of the shift of the central wavelength of transmission. Detailed fabrication processes will be described in subsequent sections using some selected examples.

According to this invention, the arrays of micro membranes required for the fabrication of miniature narrow band pass filter arrays are fabricated by a photolithography process and a micro machining process. The micro machining process is based on the strong anisotropy of etching of the substrate material by selected etching agents. To simplify the description, in the foregoing example and the following example, structure with two membranes is used. It is understood that array with number of membranes as large as 100 or even 200 can conveniently be fabricated on one substrate using the processes described. Silicon substrates are selected as the starting substrates in this description. It should be understood that substrates other than Si, such as Ge, GaAs and InGaAs, may be used to achieve the miniature filter array.

Figure 4A:
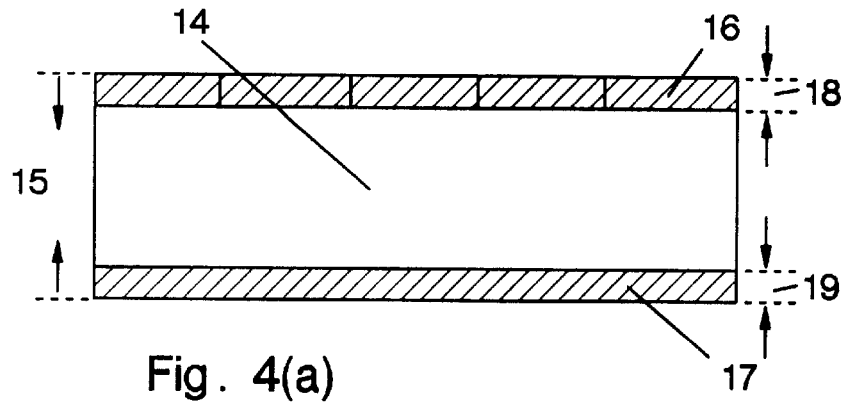
FIG. 4 (a) is the systematic cross-sectional view of a Si substrate used for the fabrication of integrated array of narrow band pass filters and (b) is the schematics top view of the same substrate after the patterning of $SiO_2$ layer.

Referring now to FIG. 4(a), where there is shown a cross-sectional view of a Si substrate (14) with a total thickness, $t_t$, (15). The value of $t_t$ may be from 200 μm to 1000 μm, preferably from 300 μm to 500 μm, which is sufficient to create micro membranes and can provide sufficient mechanical strength to the substrate during the processing. Layers of $SiO_2$ (16, 17) are formed by carrying out thermal oxidation at an elevated temperature (for example 1100° C.) in an ambient of $O_2$ and $H_2O$. The oxidation may well be achieved by a dry process without adding $H_2O$. Thicknesses (18, 19) of the $SiO_2$ layers are in the 0.2 to 1 μm range. After the oxidation, the $SiO_2$ layer (16) on the front surface is patterned by standard photolithography for Si while the oxide on the back surface (17) is protected. A top view of the etched substrate is shown in FIG. 4(b).

Figure 4B:
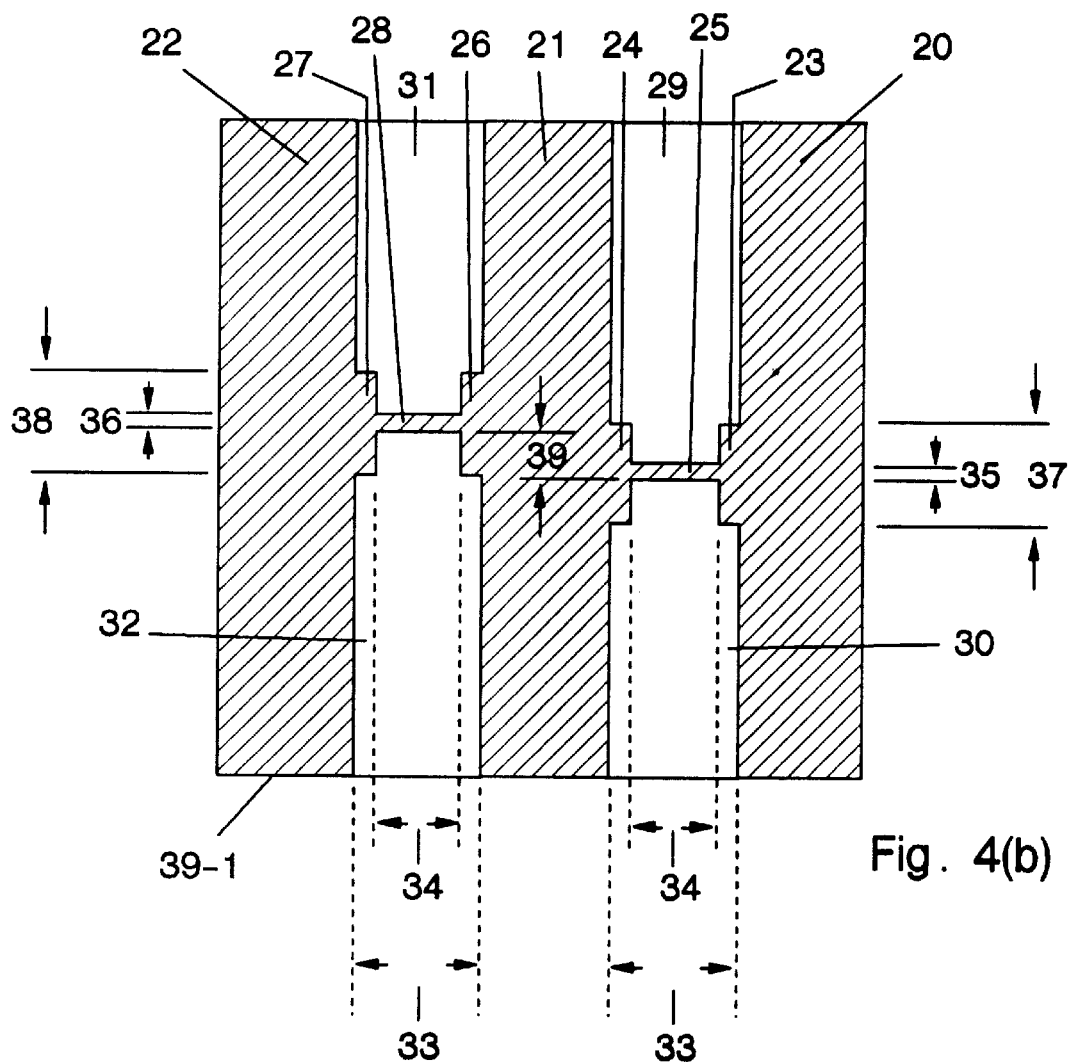

The shaded areas (20, 21, 22) in FIG. 4(b) represent the Si areas covered with $SiO_2$. Adjacent areas (20) and (21) define two unshaded regions (29, 30), which form two cavities to accommodate the two fibers (not shown) for the guiding of the incident light and the filtered light. Two small rectangular $SiO_2$ areas (23, 24) define fiber stops which prevent fibers (not shown) from touching the miniature membrane area (25). Adjacent areas (21) and (22) define two unshaded regions (31, 32), which form two other cavities to accommodate two fibers (not shown) for the guiding of incident light and filtered light. The unshaded regions represent the exposed Si areas where $SiO_2$ has been removed. Two rectangular $SiO_2$ areas (26, 27) define fiber stops which prevent fibers (not shown) from touching the miniature membrane area (28). The width (33) of areas (29, 30, 31, 32) and the width (34) of membranes (25, 28) are selected according to the diameter of the fibers to be used for the guiding of incident light and for the guiding of the filtered light, whereas the lengths (35, 36) of membranes (25, 28) are selected so that the membranes formed are mechanically strong enough during the multilayer thin film deposition. The preferred thickness of the membranes is in a range from one micrometer to about one hundred micrometers. The length of the fiber stops (37, 38) is selected to be small so that fibers can be brought very close to the membranes (25, 28), without touching the membranes, to improve the fiber core alignment and the light coupling efficiency. The distance (39, which is designated as δR in equation [4]) between membrane (25) and membrane (28) is selected according to the difference in central wavelength between Channel 1 and Channel 2. It should be noted that the long axes of the membranes (25, 28) are aligned to be parallel to the reference edge (39-1) of the substrate. This alignment is required when anisotropic etching properties are used to form the membranes, fiber stops and cavities on substrates such as Si or GaAs.

Figure 5:
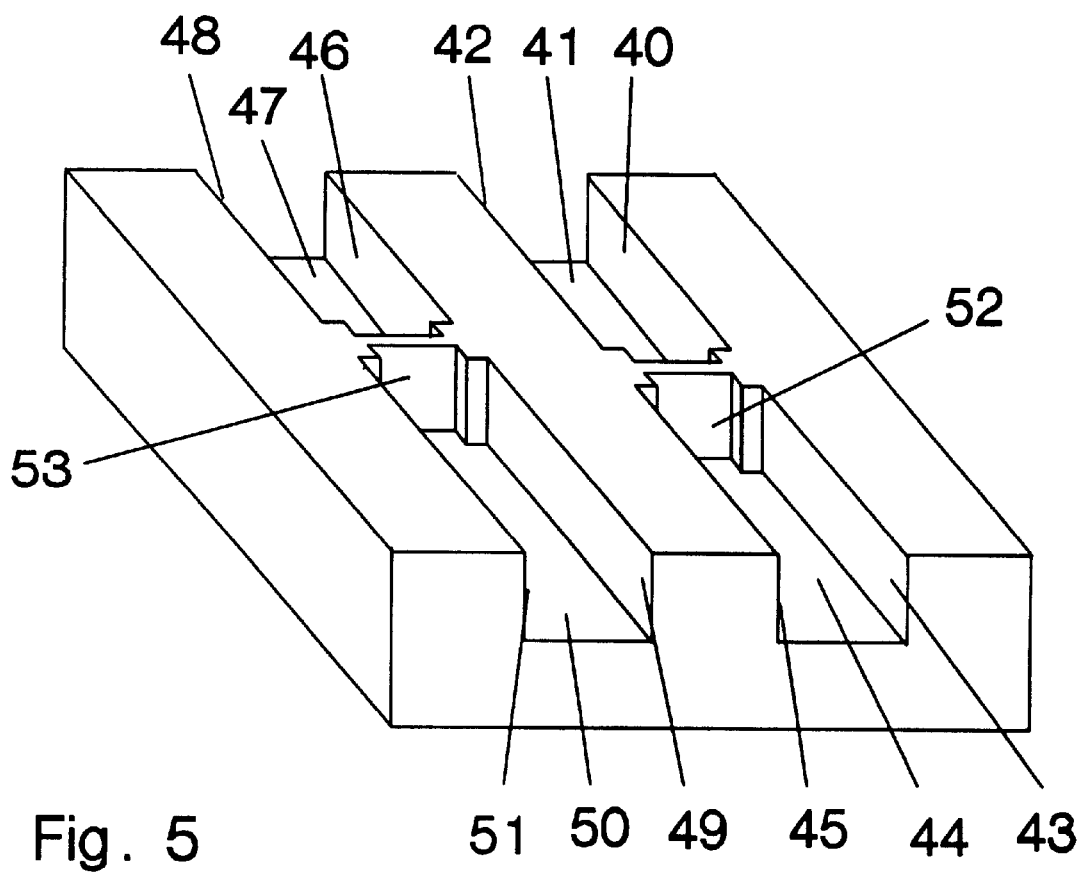
FIG. 5 is a schematic 3-D view of the substrate after micro machining with two vertical membranes for the deposition of narrow band pass filters.

After the etching of $SiO_2$ to form the patterns as shown in FIG. 4(b), the sample is then immersed in an etching solution to selectively etch the exposed Si. The etching solution used must be highly anisotropic in etching the Si in order to obtain the miniature membranes, fiber stops and cavities. The etching is terminated and the oxide is removed so that a 3-dimensional structure as shown in FIG. 5 is formed. Surfaces (40, 41, 42) define one cavity and surfaces (43, 44, 45) define the other cavity for Channel 1, whereas surfaces (46, 47, 48) define one cavity and surfaces (49, 50, 51) define the other cavity for Channel 2. A vertical miniature membrane (52) is created in Channel 1 with the main surfaces of the membrane perpendicular to the long axis of the two cavities. A vertical miniature membrane (53) is created in Channel 2 with the main surfaces of the membrane perpendicular to the long axis of the two cavities.

Figure 6A:
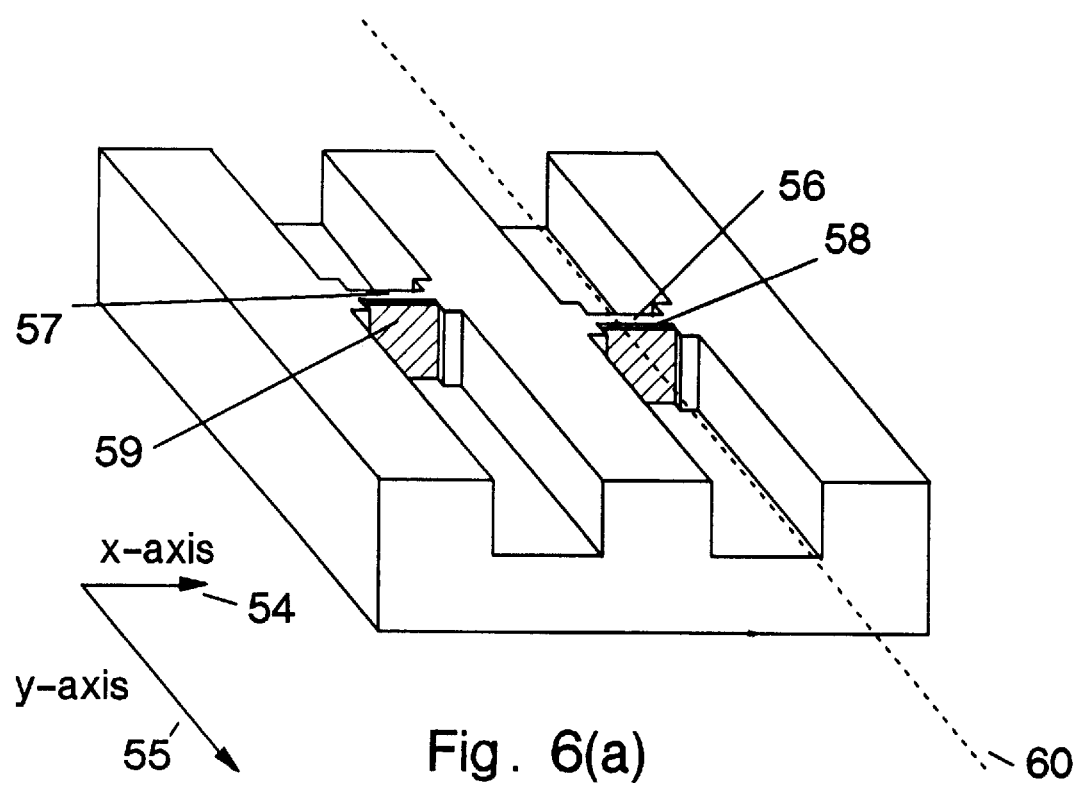
FIG. 6 (a) is a schematic 3-D view of the substrate after micro machining and the deposition of the multilayer narrow band pass filters on the two vertical membranes, and (b) is the schematic diagram showing the orientation of the substrate with respect to the source during the operation.
Figure 6B:
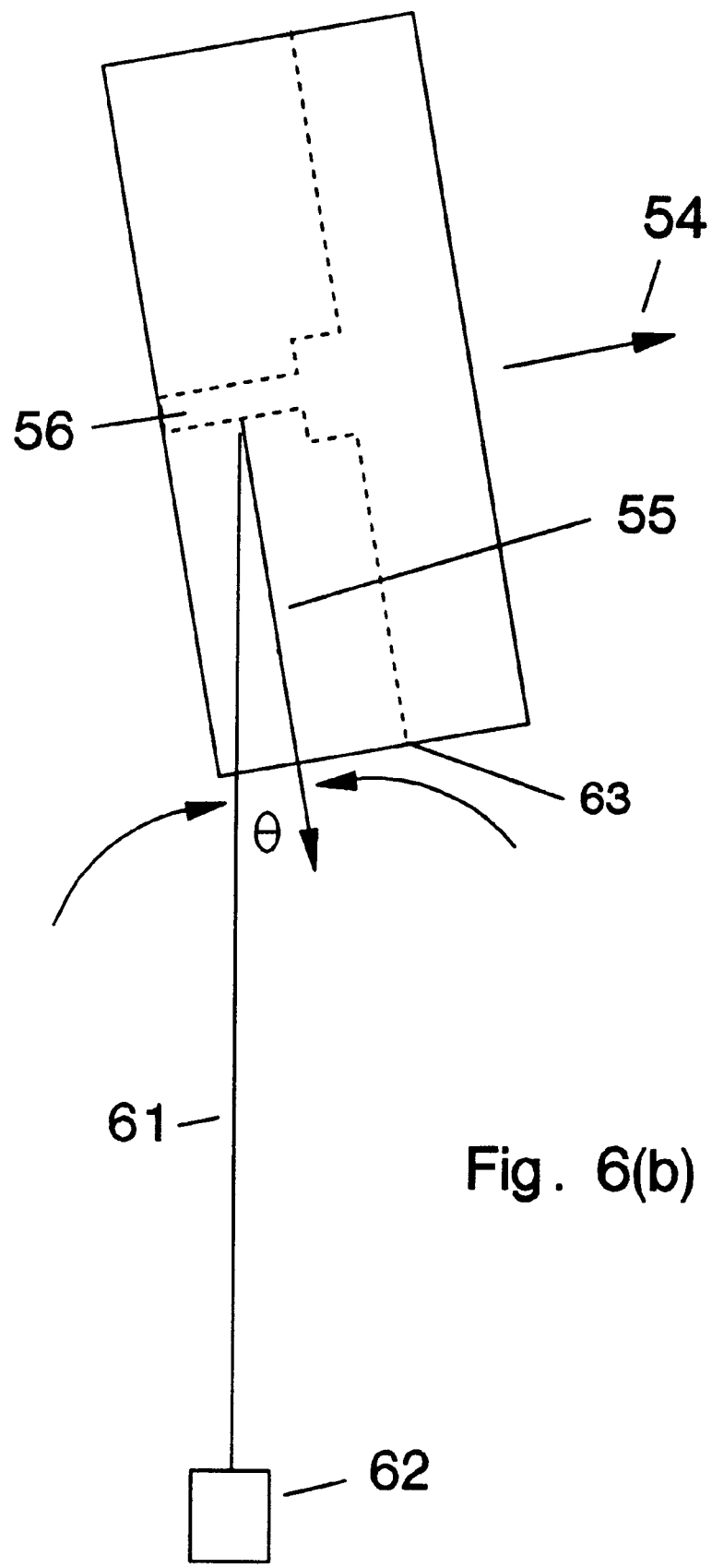

The structure as shown in FIG. 5 is then mounted in a vacuum chamber for the deposition of multilayer thin film narrow band pass filters. In order to obtain uniform thin film deposition and to prevent the edges of the substrate from obstructing the influx of molecules, atoms or ions during the deposition, it is preferred to mount the substrate in a position such that the x-axis (54, shown in FIG. 6(a)), which is parallel to the surfaces of the membranes (56,57) is nearly perpendicular to the normal line (61) of the deposition source (62) (FIG. 6(b)). However, whereas there is a small angle, θ, between the normal (61) and y-axis (55) so that the thicknesses of films (58,59) deposited on the membranes (56,57) are not affected by the edge (63) of the substrate. During the deposition, it may be necessary to rotate the substrate around the normal of the deposition source in order to obtain uniform thin films on each membrane.

Figure 7:
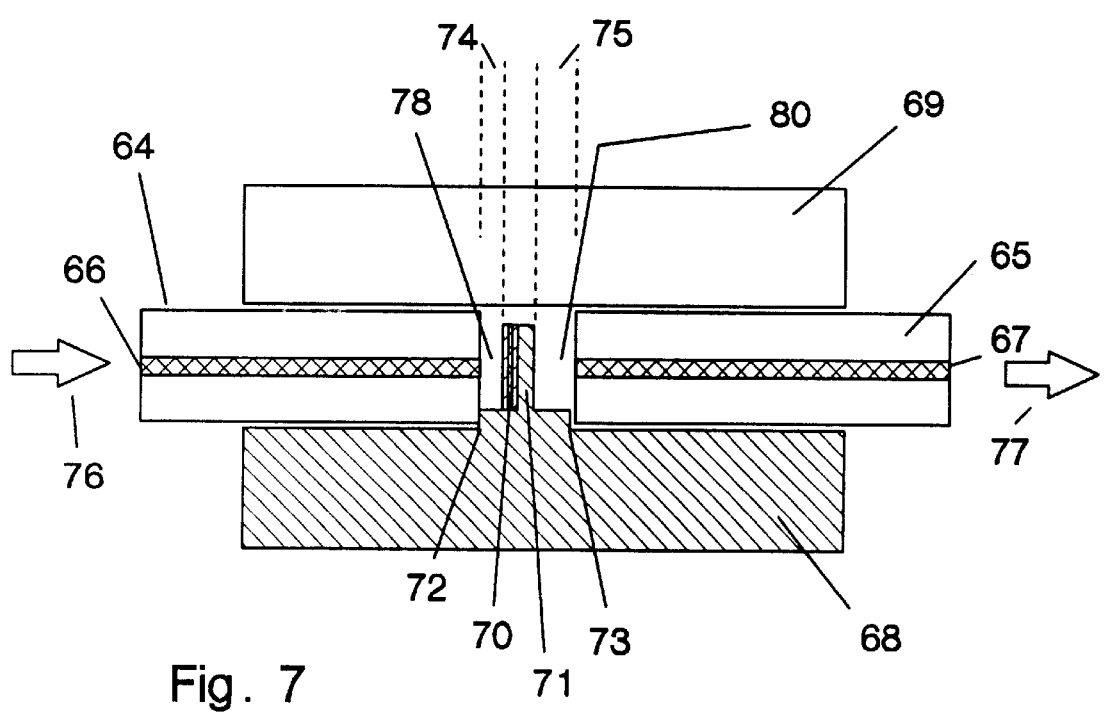
FIG. 7 is a schematic cross-sectional view of the WDM with the two fibers.

After the deposition of the multilayer thin film narrow band pass filters on the miniature membranes, the substrate is removed from the vacuum chamber for further packaging. FIG. 7 shows a cut-in view of Channel 2 in FIG. 6(a) through the dotted line (60). Two fibers (64, 65) with cores (66, 67) are used to guide the light beam. On top of the substrate, a transparent cover (69) is installed to maintain the vertical position of the two fibers. A multi-layer narrow band pass filter (70) is deposited on the micro membrane (71). By observation through the transparent cover (69) under an optical microscope, the fiber (64) can be inserted from the end facing the filter (70) until the fiber (64) is stopped by the fiber stop (72) whereas fiber (65) can be inserted from the right-hand side cavity until it is stopped by the fiber stop (73). Hence, the direct touching of the two fibers with the membrane and thin film filter is prevented.

In addition, the distance (74) between the end of fiber (64) and the surface of the thin film filter (70) and the distance (75) between the end of fiber (65) and the surface of the membrane (71) can be minimized by micro machining. Incident light beams (76) to be filtered are guided by fiber (64) whereas the filtered light beam (77) is received by fiber (65). The very small distances (74, 75) and the self-alignment nature of core (66) to core (67) of the two fibers are advantageous because the coupling efficiency of the filtered light from fiber (64) to fiber (65) can be made very high.

The coupling efficiency may also be improved by reducing the loss of light due to the coupling. In order to increase further the coupling efficiency, the space (78) between the end of fiber (64) and filter (70) and the space (80) between the end of fiber (65) and membrane (71) may be filled with an index matching substance.

Figure 8:
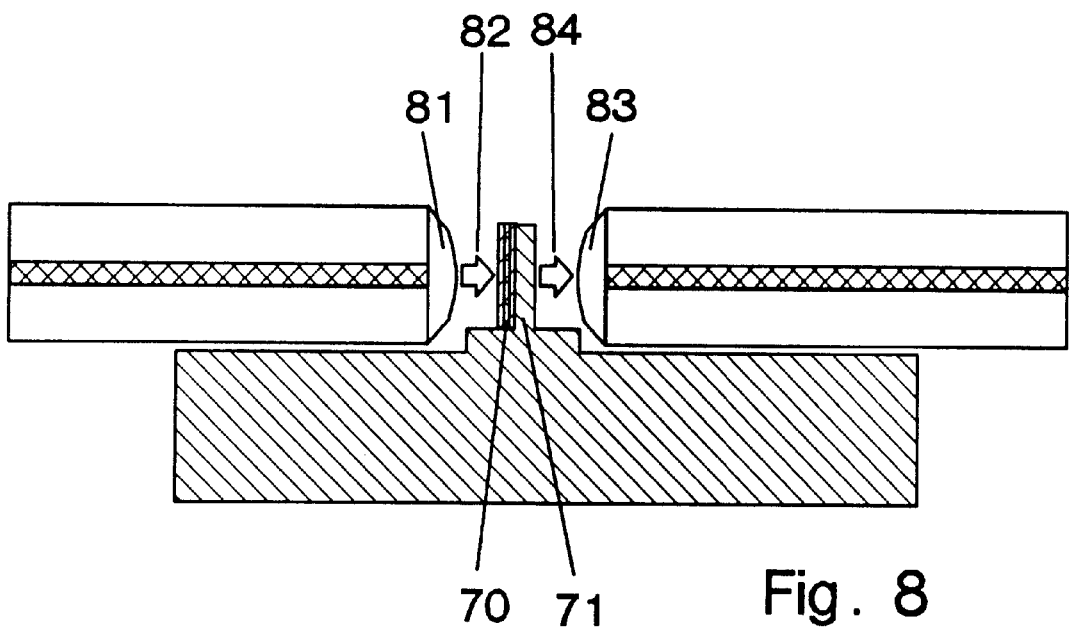
FIG. 8 is a schematic cross-sectional view of the WDM with the two fibers having micro lenses to increase the coupling efficiency.

Due to the divergent nature of the light beams at the end of a fiber, a micro lens may be formed at the fiber end to collimate the light beams in order to increase the coupling efficiency. As shown in FIG. 8, a micro lens (81) is formed on the end of fiber (64) so that the incident light beams (82) is collimated to be substantially perpendicular to the surface of filter (70). A micro lens (83) is formed at the end of fiber (65) to collect the filtered light beam (84). The micro lenses (81, 83) may be formed by flaming the ends of the fibers prior to the assembly.

Figure 9:
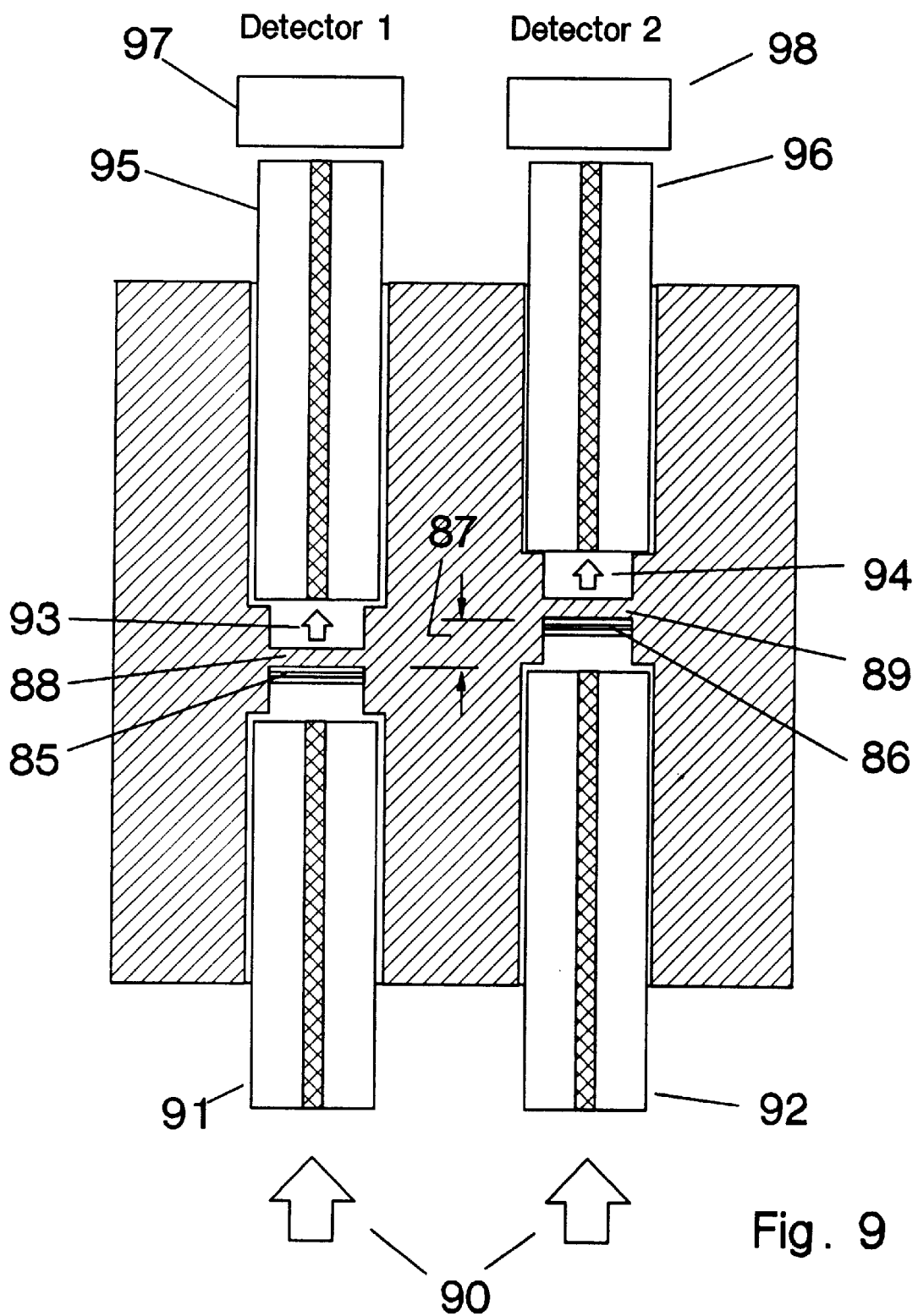
FIG. 9 is a schematic top view of the complete WDM with the two channels.

FIG. 9 shows a top view of the complete array of miniature thin film narrow band pass filters. The central wavelength of transmission, $\Omega_1$, of filter (85) of channel 1 is greater than the central wavelength of transmission, $\Omega_2$, of filter (86) of channel 2. The difference in the central wavelengths, $\delta\Omega=\Omega_1-\Omega_2$, is conveniently controlled by controlling the thicknesses of the high index layers and low index layers in the two filters. As described before, the thicknesses are determined by the distance (87) between the two membranes (88, 89). Incident light beams within a range of wavelengths are guided by fibers (91, 92) and these are screened by filters (85, 86). The filtered beams (93, 94) with wavelengths of $\Omega_1$ and $\Omega_2$ respectively are collected and guided by fibers (95, 96) and these are finally sensed by two detectors (97, 98). Hence, light beams of different wavelengths are separated by the integrated narrow band pass filter array.

Figure 10:
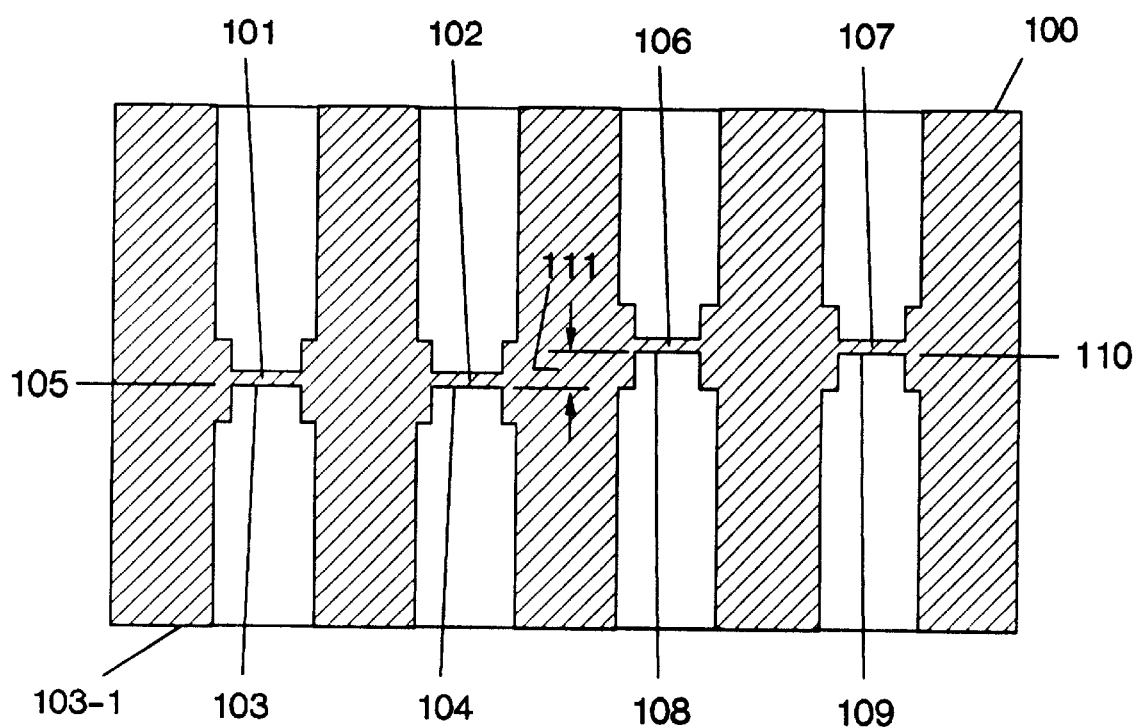
FIG. 10 is a schematic view of an integrated WDM with redundant filters.

In order to improve the reliability of the integrated narrow band pass filter array, more than one membrane and filter may be fabricated with the same thin film thicknesses and hence with the same central wavelength of transmission. FIG. 10 shows a schematic top view of the integrated narrow band pass filter array with redundant filters. To simplify the description, a structure (100) with two different central wavelengths is used. Two membranes (101, 102) are formed with surfaces (103, 104) aligned at one level (105). Two other membranes (106, 107) are formed with surfaces (108, 109) aligned at a second level (110). The distance (111) between the two groups of membranes is selected according to the difference in central wavelength required. When multilayer thin film filters are deposited on all four membranes (101, 102, 106, 107), the central wavelength of the filter on membrane (101) will be the same as the central wavelength of the filter on membrane (102), whereas the central wavelength of the filter on membrane (106) will be the same as the central wavelength of the filter on membrane (107). Because of the redundant nature of the integrated filter array, the array has more than one filter per level, any defects due to the fabrication will not render the entire integrated array useless. It should be noted that during the fabrication, the surfaces (103, 104, 108, 109) are aligned to be parallel to the reference edge (103-1) of the substrate. This alignment is required when anisotropic etching properties are used to form the membranes, fiber stops and cavities on substrates such as Si and GaAs.

Figure 11:
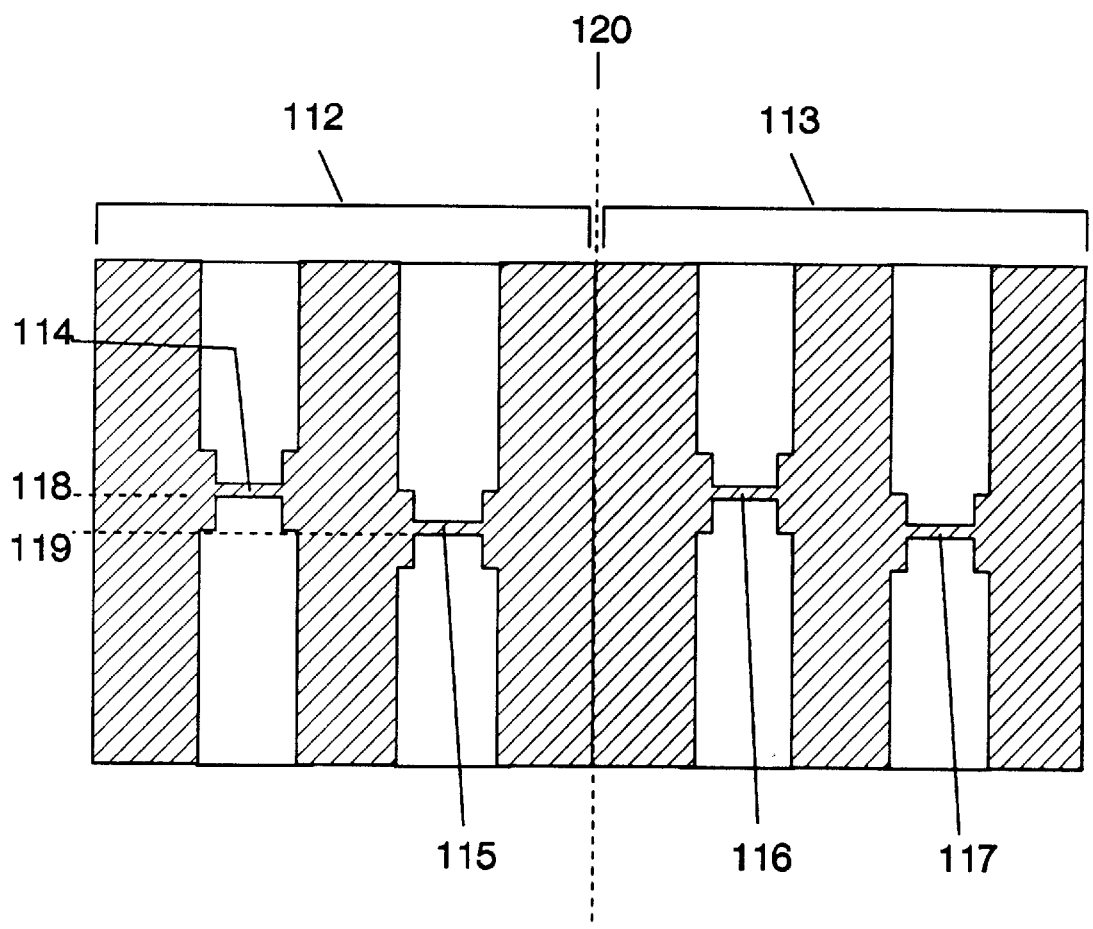
FIG. 11 is a schematic view of two symmetrical integrated WDMs fabricated on the same substrate.

In practical applications, it may be desirable to obtain more than one WDM or DWDM with the same set of central wavelengths. Hence, in another embodiment of the present invention, more than one integrated narrow band pass filter array with the same transmission wavelengths for the corresponding filters may be fabricated during the same thin film deposition run. As shown in FIG. 11, two arrays of membranes are micro machined in the same substrate, membranes (114) and (115) constitute one array (112) whereas membranes (116) and (117) constitute another array (113). The main surface of the membrane (114) is located at one level (118) which is the same as that of the main surface of membrane (116). The main surface of membrane (115) is located at the same level (119) as that of the main surface of membrane (117). During the deposition of the multilayer narrow band pass filters, the main surfaces of all the membranes are held perpendicular to the normal of the deposition source. Hence, thicknesses of all layers on membrane (114) will be same as the corresponding thicknesses of all layers on membrane (116).

Thus the central wavelength of transmission for the filter on membrane (114) will be the same as the filter on membrane (116). Similarly, thicknesses of all layers on membrane (115) will be same as the corresponding thicknesses of all layers on membrane (117) but will be slightly greater than the thicknesses of the corresponding layers on the two membranes (114) and (116). Thus the central wavelength of transmission for the filter on the other membrane (115) will be the same as the filter on membrane (117) and the value will be larger than the central wavelength of transmission of filters on membranes (114) and (116). Since the central wavelength of transmission through the filter on membrane (114) is the same as that through the filter on membrane (116) and the central wavelength of transmission for the filter on membrane (115) is the same as that on membrane (117), array (112) is equivalent to array (113).

After the multilayer thin film deposition, the substrate can be scribed along the line (120) to obtain two separate miniature filter arrays.

Figure 12:
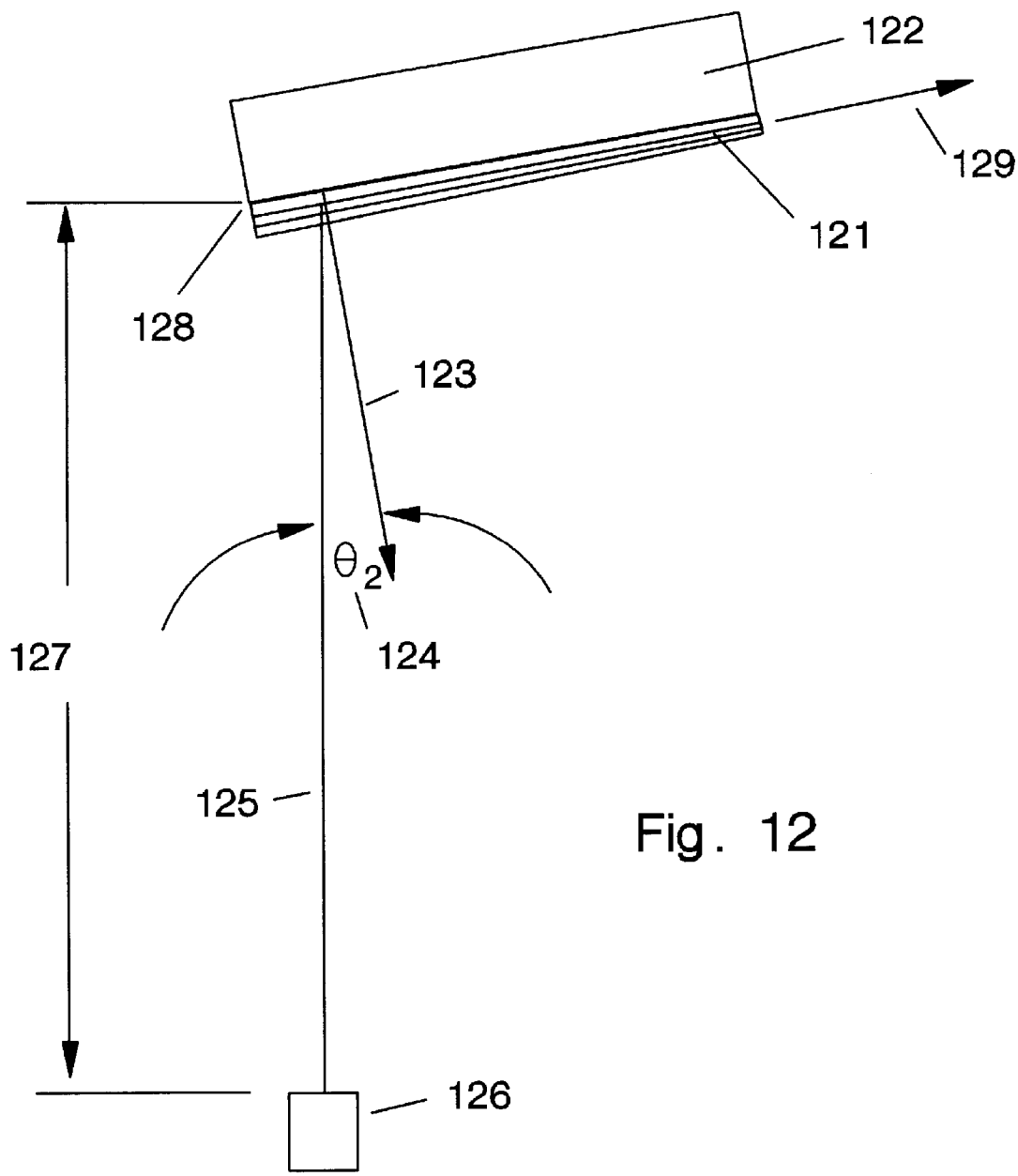
FIG. 12 is a schematic diagram showing the relative position of filter substrate and deposition source for the fabrication of variable narrow band pass filter.

In another embodiment of the present invention, a linear variable narrow band pass filter is incorporated with a plurality of fibers into a micro machined substrate to form a WDM or DWDM. As shown in FIG. 12, multilayer thin films (121) are deposited on a transparent substrate (122) mounted in such a way so that the normal of the substrate (123) is at an angle, $\theta_2$ (124), with respect to the normal (125) of the deposition source (126). The distance (127) between a point near one edge (128) of the transparent substrate and the deposition source (126) is selected so that at the edge, the thicknesses of all high index layers, $t_H$, equal $\Omega/(4n_H)$ and the thickness of all low index layers, $t_L$, equal $\Omega/(4n_L)$. Here $\Omega$ is the central wavelength of transmission of the part of the variable narrow band pass filter near the end. $n_H$ is the refractive index of the high index materials whereas $n_L$ is the refractive index of the low index materials.

Figure 13:
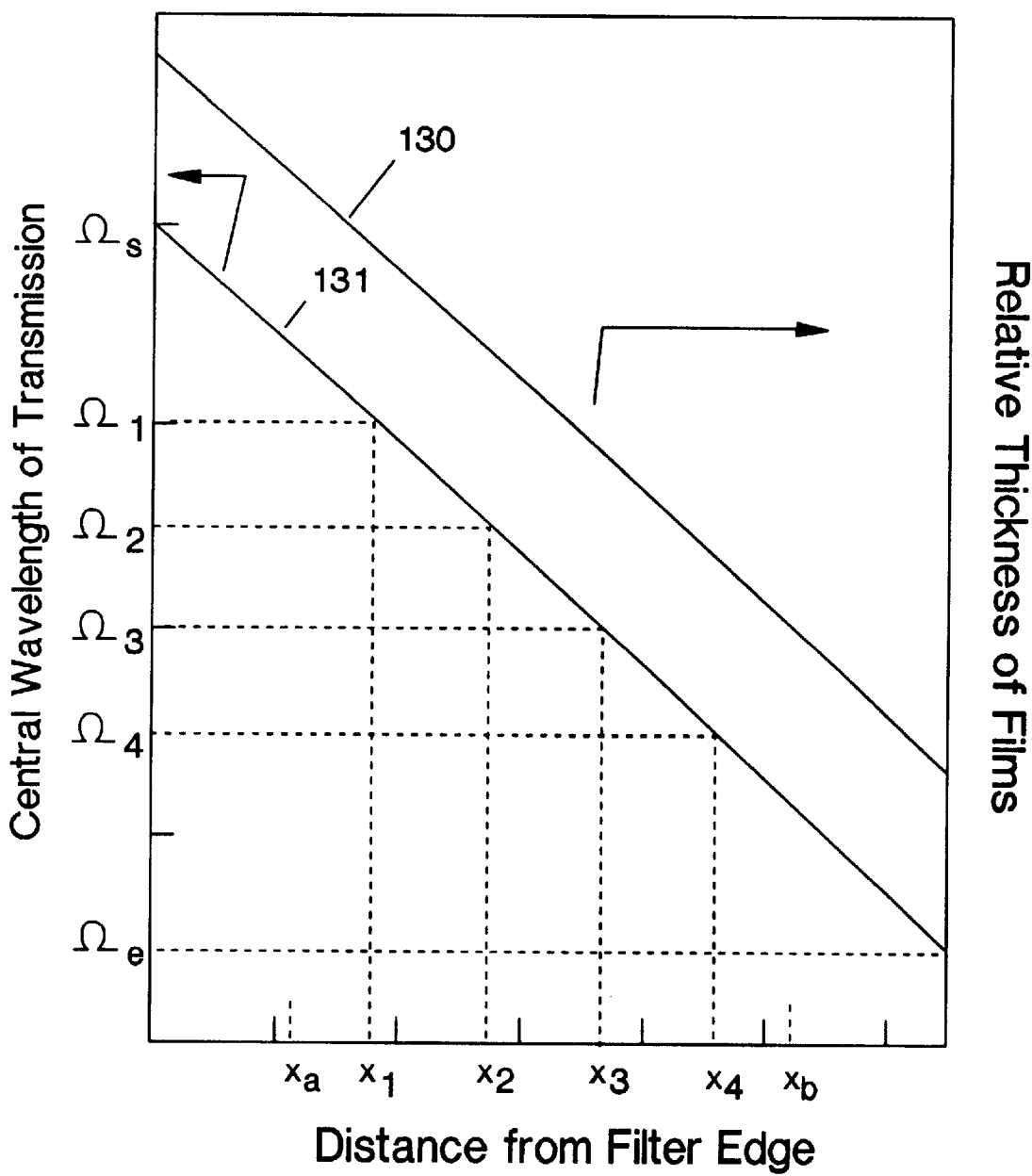
FIG. 13 shows the variation of relative thickness of the deposited films and the corresponding variation of central wavelength of transmission.

By selecting the value of the angle, $\theta_2$ (124), between the normal of the transparent substrate and the normal of the deposition source, the distance between the deposition source and the transparent substrate surface can be increased in the positive x-direction (129). After the deposition of the multilayer thin film filters, the thicknesses of both the high index layers and the low index layers decrease with the increase of distance in the x-direction. Hence, the central wavelength of transmission decreases with the increase in distance. For a value of $\theta_2$ within the range $0<\theta_2<90°$, the rate of decrease in the central wavelength of transmission can be determined. The preferred range of the angle is $0<\theta_2<50°$ so that the variation in film thickness along the x-direction (129) can be reproduced. FIG. 13 shows how the relative thicknesses (130) of the films and the central wavelength of transmission, $\Omega$ (131), of the filter vary with distance, x. Here, the relative thickness of a film is defined as the ratio of the thickness of a film at a given position, x, to the thickness of the corresponding film at x=0, which is located at point (128) in FIG. 12. Due to the progressively increasing distance between the source (126) and the substrate surface, with increasing x value, the relative thicknesses of the films decreases.

Since the rate of decrease in relative thickness is the same for all layers, a variable narrow band pass filter is formed with the central wavelength of transmission decreasing from $\Omega_s$ to $\Omega_e$ as the value of x is increased. To simplify the description, assume one wants to construct a 4-channel WDM or DWDM with central wavelengths of transmission at $\Omega_1$, $\Omega_2$, $\Omega_3$ and $\Omega_4$. To receive filtered beams of the above four wavelengths, it is required to place four pairs of fibers at positions $x_1$, $x_2$, $x_3$ and $x_4$. The spacing between the adjacent channels: $x_2-x_1$, $x_3-x_2$ or $x_4-x_3$ is made to be larger to the outer diameter of the fibers used. It is preferred that the spacing to be considerably larger than the diameter of the cores of the fibers. For instance, the spacing may be 400 micrometers whereas the fiber core diameter may be less than 20 micrometers. Hence, the alignment of fibers at the four positions, $x_1$, $x_2$, $x_3$ and $x_4$, can easily be achieved with a micro machined substrate.

To construct the four-channel WDM or DWDM, a section of the transparent substrate (with the deposited multilayer films) between $x=x_a$ and $x=x_b$, can be cut out to form a variable narrow band pass filter. The variable narrow band pass filter can now be assembled with fibers to form a WDM or DWDM.

According to this invention, a micro-machined substrate to install both the filter and fibers is used to facilitate the alignment of the fibers for the guiding of incident light beams and for the receiving of filtered light beams. As stated before, after the deposition of the multilayer thin films, the actual variation in central wavelength of transmission with distance is measured and a portion of the transparent substrate with films is selected and cut. The selected portion is a variable narrow band pass filter which contains all desired central wavelength of transmission. The length of the selected variable narrow band pass filter is $L_f=x_b-x_a$ (see FIG. 13) and the thickness is $t_f$. The measured results are then used to design or select the housing for both the variable narrow band pass filter and fibers for the guiding of the light beams.

Figure 14:
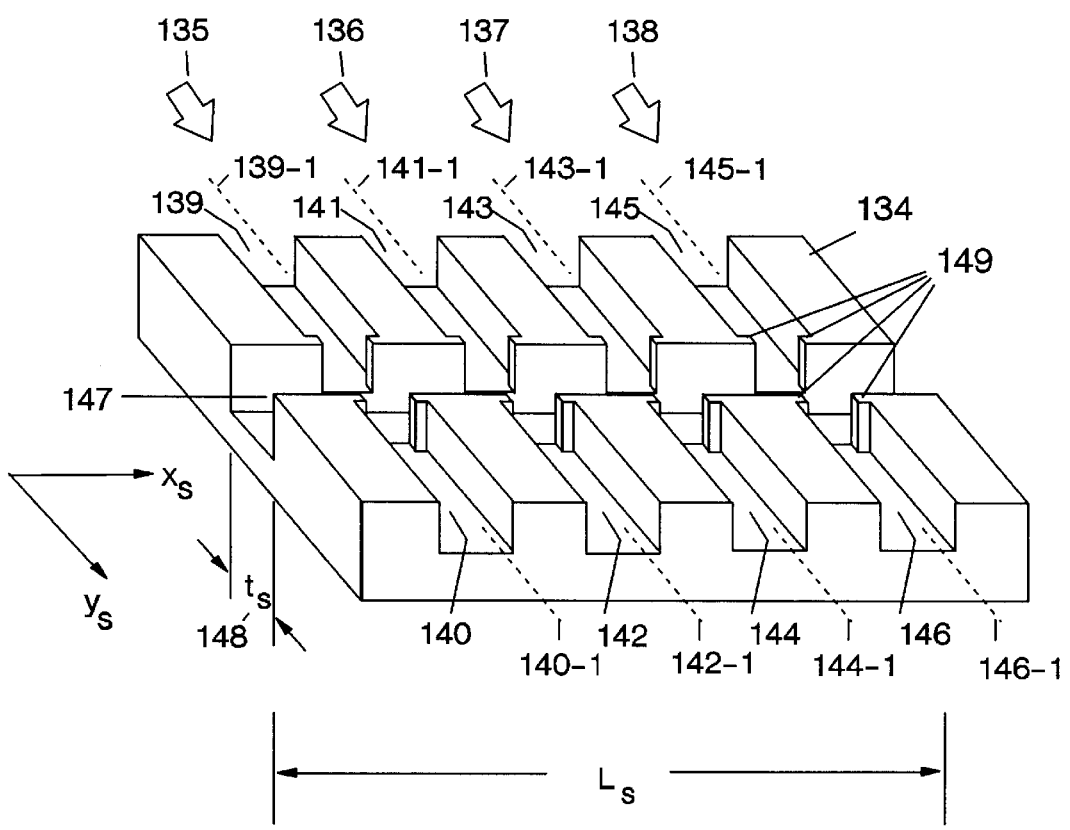
FIG. 14 is a schematic diagram showing a substrate structure to accommodate the variable narrow band pass filter and the fibers to form a WDM.

As shown in FIG. 14, a fiber holder (134) with 4 channels (135, 136, 137, 138) is fabricated by micro machining a Si substrate. Each channel contains two cavities, (139 and 140), (141 and 142), (143 and 144) and (145 and 146), which are used to accommodate the fibers for the guiding of incident and filtered light beams. A slot (147) is micro machined with the long axis $(x_s)$ perpendicular to the long axis of the cavities $(y_s)$. The purpose of the slot is to accommodate the variable narrow band pass filter. The length of the slot is $L_s$ and the width is $w_s$. Central line (139-1) of cavity (139) coincides with central line (140-1) of cavity (140), central line (141-1) of cavity (141) coincides with central line (142-1) of cavity (142), central line (143-1) of the cavity (143) coincides with central line (144-1) of cavity (144), whereas central line (145-1) of the cavity (145) coincides with central line (146-1) of cavity (146). Hence, when fibers (151–158 in FIG. 15) are installed in these cavities, the cores of the fibers in each channel are aligned automatically.

The distance between the central lines of the cavities in adjacent channels is kept to be same as the distance between the adjacent channels in the filter (see FIG. 13). For instance, the distance between (139-1) and (141-1) in FIG. 14 is equal to $x_2-x_1$ in FIG. 13, the distance between (141-1) and (143-1) is equal to $x_3-x_2$ and the distance between (143-1) and (144-1) is equal to $x_4-x_3$. Hence, when fibers are installed in all of these cavities, the distance between cores of the fibers in one adjacent pair will coincide with the corresponding distance between adjacent channels in the variable narrow band pass filters. It is clear that an aligned cavity pair has been fabricated for each channel and a WDM is obtained. The widths $(w_c)$ of all the cavities are kept the same and equal to one value and the depths $(d_c)$ of all the cavities are kept the same and equal to another value. The widths and depths of the cavities are selected so that the fibers that guide the light beams can be installed with their cores aligned and with the core centers located at positions along the center line of the variable narrow band pass filter. At the slot end of each cavity, there are two fiber stops (149) which prevent the fibers from touching the variable narrow band pass filter to be inserted. The complete WDM structure can be understood by examining the schematic top view shown in FIG. 15.

Figure 15:
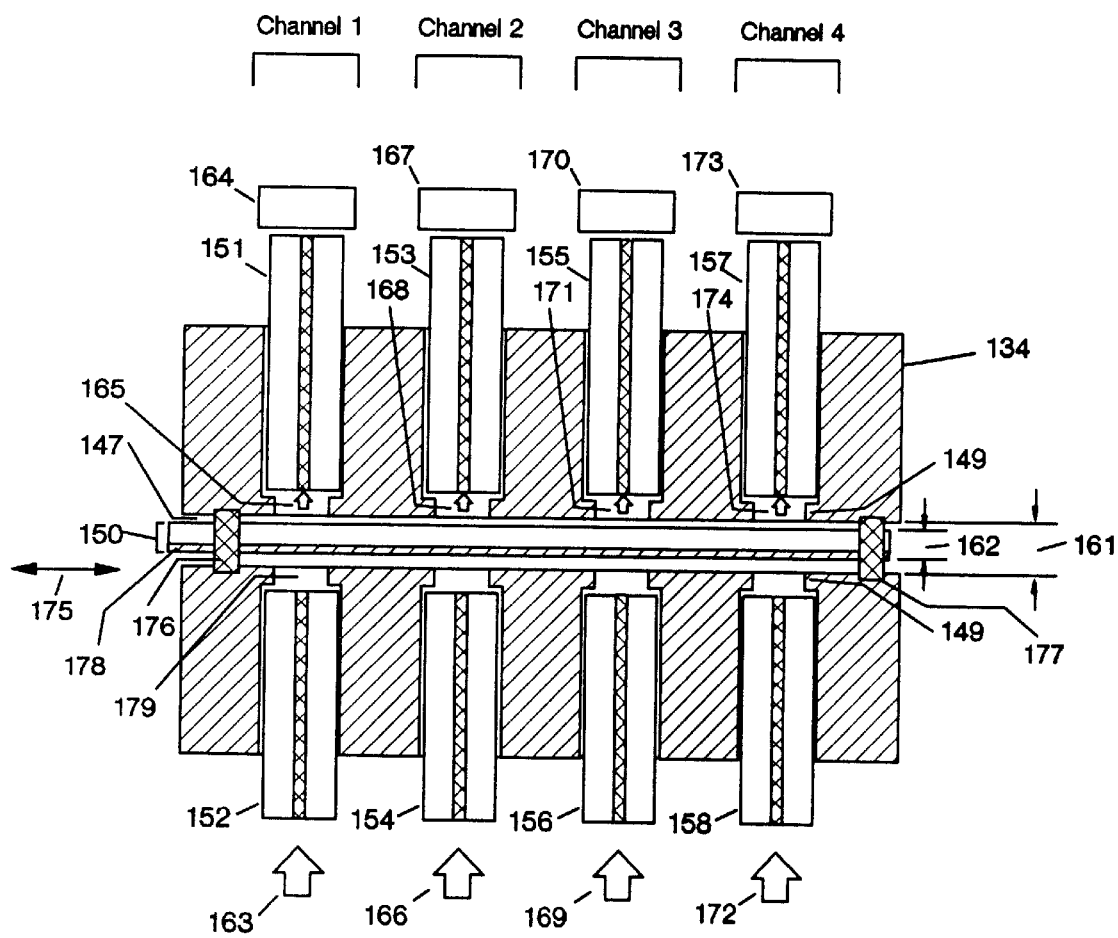
FIG. 15 is a schematic top view showing the substrate structure with a variable narrow band pass filter and 4 pairs of fibers for the final alignment of the filter.

FIG. 15 shows a schematic top view of the 4-channel WDM and how the variable narrow band pass filter (150) is located in the slot (147) and how the fibers (151, 152, 153, 154, 155, 156, 157, 158) are located in the cavities. Value of $L_s$ (149-1 shown in FIG. 14) is selected so as to be greater than the length of the filter, $L_f$ (not shown), and value of $t_s$ (161) is selected to be greater than $t_f$ (162). For this reason, the variable narrow band pass filter can be inserted into the slot and final adjustment of the filter position with respect to all cavities can be made (see FIG. 15). The purpose of the alignment is to obtain the desired central wavelength of transmission for each pair of fibers inserted in one pair of cavities.

The alignment can be achieved by sending a beam of light (163) with a central wavelength of $\Omega_1$ and variable narrow band width of $\delta\Omega$ through the fiber (152). At the end of the corresponding fiber (151), an optical detector (164) is installed to measure the intensity of the filtered beam (165). By a fine adjusting of the position of the variable narrow band pass filter in the x-direction (175) and by observing the maximum output from the detector (164), the filter position with respect to the fiber holder so that the central wavelength of transmission for channel 1 is equal to $\Omega_1$ can be precisely determined and controlled. Because the substrate was micro machined so as to guarantee precise spacings between adjacent pairs of cavities, the distance between the cores of adjacent fiber pairs can be precisely maintained at the following values: $x_2-x_1$, $x_3-x_2$ or $x_4-x_3$ (see FIG. 13). Hence, the central wavelength of transmission of the filtered beam (168) in FIG. 15 for channel 2 will be $\Omega_2$, the central wavelength of transmission of the filtered beam (171) of channel 3 will be $\Omega_3$ and the central wavelength of transmission of the filtered beam (174) of channel 4 will be $\Omega_4$.

After the fine alignment, the position of the variable narrow band pass filter with respect to the substrate and with respect to the fibers is maintained by applying epoxy near the two end regions (176, 177) in FIG. 15 of the filter. The epoxy is cured to harden it before final packaging.

Due to the divergent nature of the light beams at the end of a fiber, it is preferable to install the variable narrow band pass filter in an orientation so that the surface coated with the multi layer thin films is facing the end of the fiber which is used to guide the incident light. In FIG. 15, it is seen that the surface of the filter (150) coated with the multilayer thin film (178) is facing the fibers (152, 154, 156, 158) guiding the incident light beams. The purpose of this filter orientation is to minimize the area of the variable narrow band pass filter being illuminated by the incident beam so that both the values of the central wavelength of transmission and the band width for each channel can be precisely maintained. To improve further the coupling efficiency between the two fibers in each channel, index matching material may be applied to the space (179) between the filter and the end of fiber.

Figure 16:
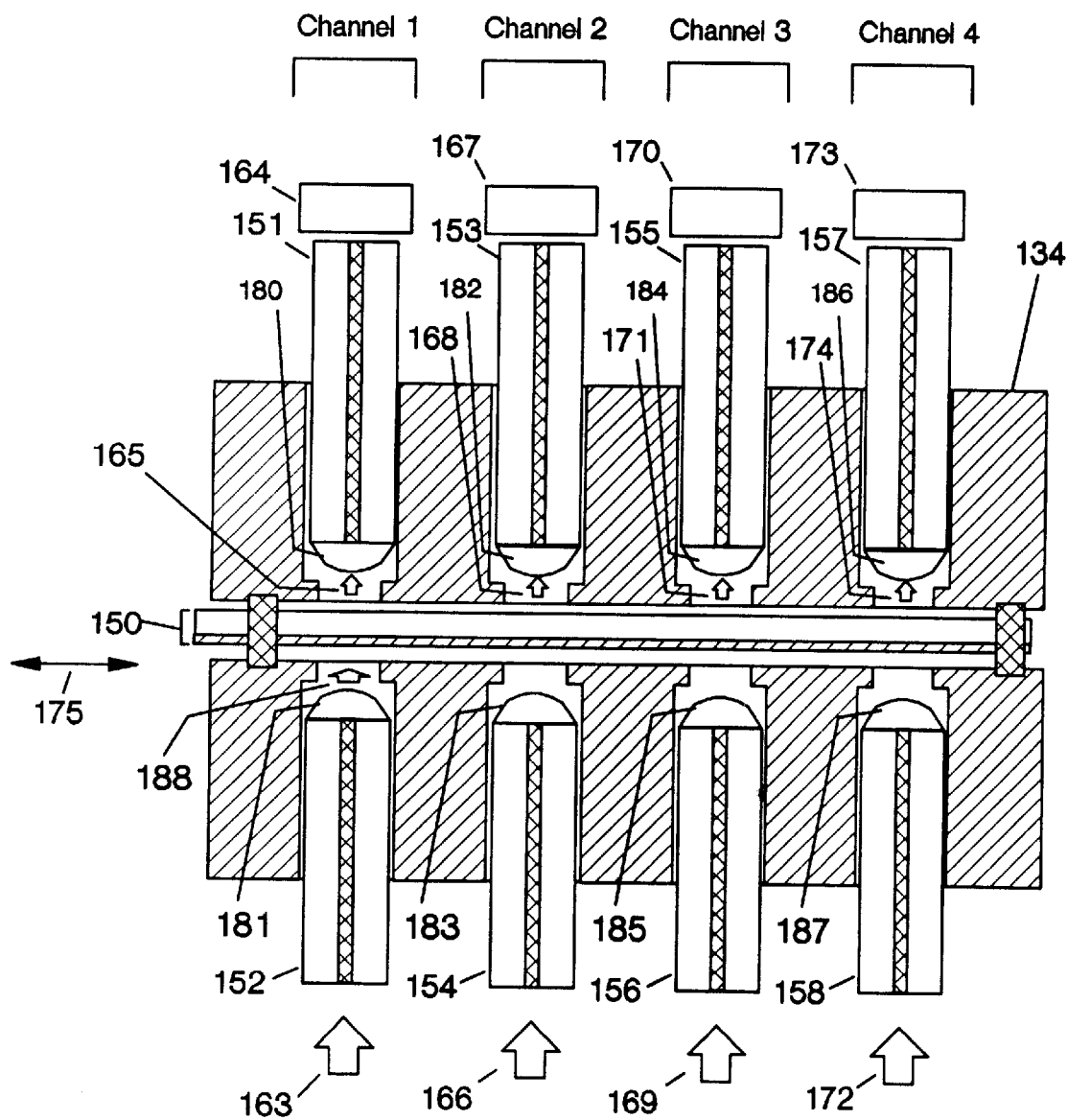
FIG. 16 is a schematic top view showing the substrate structure with a variable narrow band pass filter and 4 pairs of fibers. At the end of each fiber, a micro lens is formed to collimate the beams and to increase the coupling efficiency.

In addition to the above, a micro lens may be formed at one end of each fiber to collimate the light beams in order to increase the coupling efficiency. As shown in FIG. 16, a micro lens (180, 181, 182, 183, 184, 185, 186, 187) is formed on the end of each fiber. The micro lenses may be formed by flaming the ends of the fibers prior to the assembly. In channel 1, for example, the incident light beams (163) passing through the core of fiber will be collimated to a beam (188). This beam will be perpendicular to the surface of filter (150). Hence, the central wavelength of transmission for this channel will not be affected by the angle of incidence, which may alter the optical path length through the multilayer filter. The filtered beam (165) is finally collimated by another micro lens at the end of the fiber (151) facing the filter.

It should noted that in the actual design, the spacing between the cores of an adjacent pair of fibers can be made much larger than the diameter of the cores of the fibers used. For instance, a spacing of 400 micrometers between an adjacent pair of fibers may be used. Typical value of core diameter for single mode fibers is about 10 micrometers or less. Hence, for a channel wavelength spacing of 2 nm, the central wavelength can easily be controlled to within ±0.01 nm of the selected value. For a channel wavelength spacing of 0.8 nm, the central wavelength spacing can easily be controlled to a value within ±0.004 nm of the selected central wavelength of transmission.

Example for the Micro Machining of Si Substrates for DWDMs

In this example, a process for the micromachining of Si substrates for the fabrication of membrane arrays and cavity arrays for DWDMs is given. To minimize confusion, crystal planes are indicated by braces, { }. A {110} plane-oriented and polished Si substrate ((190) in FIG. 17) of thickness about 500 micro meters is used. A layer of oxide, 0.5 to 1.0 micrometer thick, is allowed to form on the Si surfaces by an oxidation process. The oxidation process is carried out at 1150° C. for 4 hours in an ambient atmosphere containing $O_2$ and $H_2O$. After the oxidation, the oxide layer is patterned by conventional photolithography process involving applying a layer of positive photoresist, baking the photoresist and exposing to UV light through a photomask.

Figure 17:
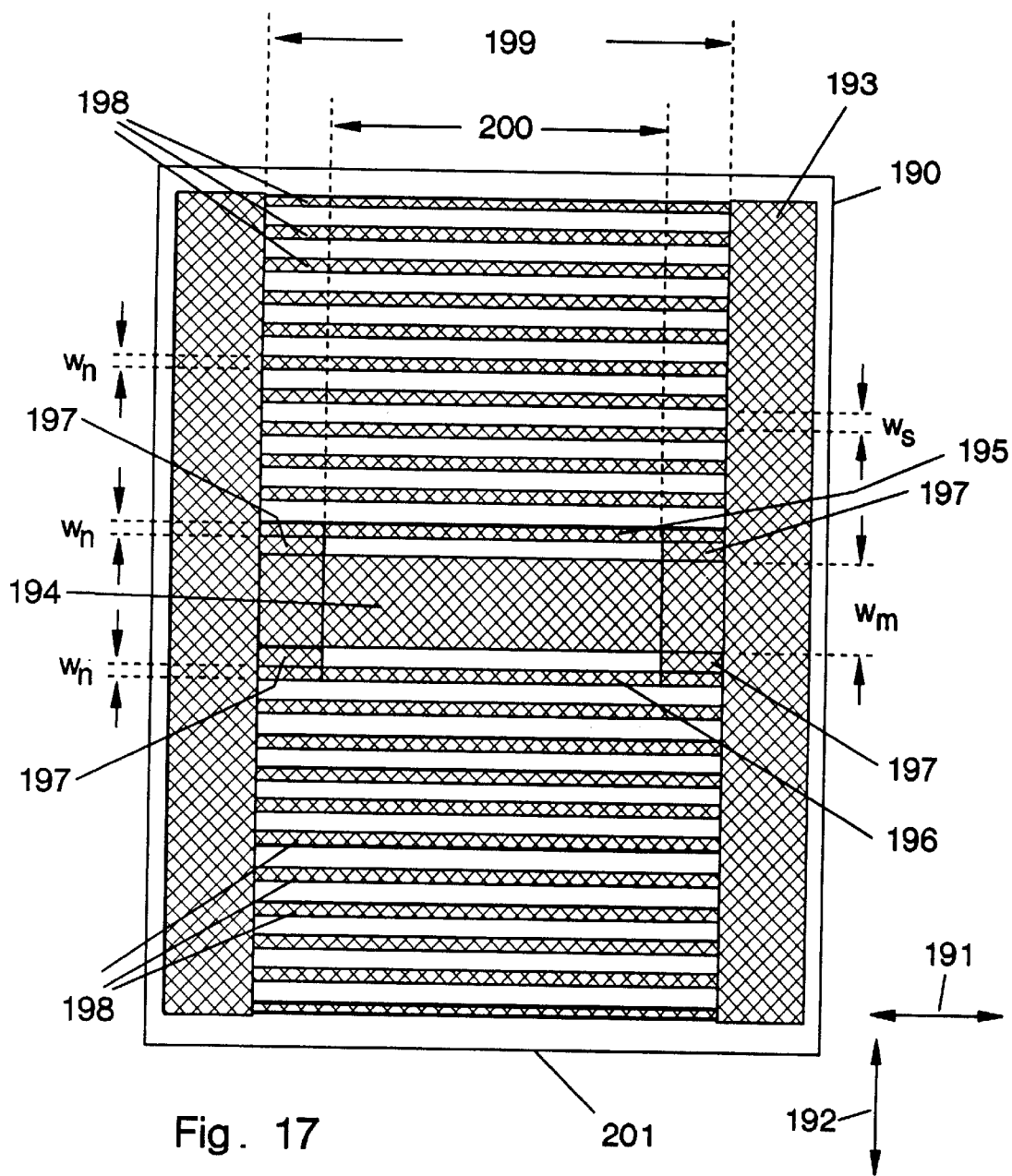
FIG. 17 is a schematic diagram of the {110}oriented Si substrate and the mask patterns used to create the micro membrane, fiber stops and the cavities.

A photo mask with shaded patterns (193) is used to define regions for the etching. There are long strips (194, 195, 196, 198) which are parallel to each other. Before exposing to UV light, the long axis (191) of each of the above strip is aligned with the intersection of the {110} plane and the {111} plane of the Si substrate. The intersection is indicated by (201) in FIG. 17. This intersection thus serves as a reference line for the alignment. It should be noted that this alignment is required when anisotropic etching properties are used to form the membranes, fiber stops and cavities on substrates such as Si or GaAs. The normal of the {111} plane is indicated by (192). The {111} plane for the alignment should be the one which is perpendicular to the {110} plane. It should be noted that there are other {111} planes which make angles other than 90° with the {110} plane. After the UV light exposing, the photoresist is developed and the exposed $SiO_2$ is etched to produce a $SiO_2$ pattern which is the replica of the mask as shown in FIG. 17. After the etching of $SiO_2$, the remaining photoresist is removed.

The substrate is ready for anisotropic etching of Si to form micro membranes and cavities. As shown in FIG. 17, the purpose of the $SiO_2$ strip (194) with a width of $w_m$ is to define a micro Si membrane. Two narrow shaded strips (195, 196) with a width $w_n$ are to define the four fiber stops (197). On the two sides, there are many narrow shaded strips (198) with equal width, $w_n$, and equal spacing, $w_s$. The purpose of strips (198) is to define two cavities to accommodate fibers. The length (199) of the strips (198) is 400 micrometers whereas the length (200) of strips (194, 195, 196) is 200 micrometers. Value of $w_n$ is about 6 micrometers whereas spacing $w_s$ is 12 micrometers. Width of the strip (194), $w_m$, is about 30 micrometers, which is sufficient to form a micro membrane with a thickness of more than 20 micrometers.

An etching solution of KOH (30%–50%) and $H_2O$ (70%–50%) maintained at about 50–90° C. is used for the etching. The ratio of etching rates between the {110} plane and {111} plane is about 25 or more. When the mask is aligned so that long axis of the strip is parallel to one of the two {111} planes which are perpendicular to the surface of the substrate, a vertical Si membrane corresponding to each shaded $SiO_2$ strip will be formed during the etching. With the above described dimensions for both shaded strips and spacings, each mini cavity formed in a region between adjacent strips will be defined by six {111} planes. Two of the {111} planes, which define vertical membrane under each shaded strips, are perpendicular to the {110} plane. The depth of cavities formed in each exposed Si region defined by two adjacent shaded strips (198) will be about 100 micrometers. The etching rate of the mini cavities decreases drastically when fully etched and all surfaces are {111} planes.

It should be noted that the values of width, $w_n$, and length (199) are selected so that at the end of the etching, the thicknesses of Si membranes under the narrow strips (195, 196, 198) is either equal to zero or close to zero whereas the thickness of Si membrane under shaded strip (194) is about 24 micrometers. After the anisotropic Si etching in the KOH+H$_2$O solution, the SiO$_2$ indicated by the shaded regions is removed by etching in a buffered HF solution. If only the thicknesses for some of the membranes are reduced to zero (except the one under strip (194)), the substrate is immersed in an isotropic etching solution for 1–5 minutes to clear all of the narrow Si membranes. An example of the isotropic etching solution is a mixture of HNO$_3$, HF and acetic acid at a ratio of 25:1:10 by weight.

It is thus clear that in this example, the micro machining is done by etching of the exposed Si regions using solutions with strong etching anisotropy. In other words, the etching rate in the {110} plane is much greater than the etching rate in the {111} plane so that the membrane arrays and cavity arrays can be formed. The solution used for the micro machining of the Si in this example is a solution of KOH and H$_2$O. It should be noted that the ratio of etching rates may vary with the temperature of the solution. Hence, the values of width and length of the narrow strips defining the cavities and membrane will have to be adjusted accordingly.

In this example, a temperature of about 50–90° C. is used. At a temperature in the above range, micro machining of the membrane and cavity structure using the mask shown in FIG. 17 can be completed in about 0.5 hr to 4 hrs.

The reason why the pattern shown in FIG. 17 is used to define the exposed Si for the micro machining is because of the etching characteristic of the KOH+H$_2$O solution. When (110) oriented Si is etched by the KOH solution, due to the strong anisotropy of the etching, a cavity is finally formed with all of the surfaces defined by the slow etching (111) surfaces. Therefore, in order to minimize zig-zagging in the structure along the (111) direction, which is the preferred direction for the formation of micro membranes, rectangular strips are used to define rectangular windows for the etching. It should be noted that the zig-zag structure is defined by the (111) planes. Hence, the height of the zig-zag peaks in the micro machined Si will be of the order of the width of the windows, $w_s$.

As indicated before, another important consideration in the design of the mask is the width of the strips, $w_n$. During the anisotropic etching of the unshaded regions, which define the cavities, the main faces of Si under the shaded strips are also etched. The etching rates of the main faces and the unshaded regions are determined by the etching anisotropy. It is preferable to etch through the Si under the strips immediately before the etching of the Si regions for the cavities in complete. In this example, the depth of etching in the {110} direction is about 100 micrometers. Hence, the width of the strips should be about 8 micrometers or less with an etching rate anisotropy of about 25. It is thus clear that after the etching in the KOH+H$_2$O solution, the Si between the SiO$_2$ strips (with a width $w_n$) and the bottom of the cavities or between the SiO$_2$ strips is completely removed.

Figure 18:
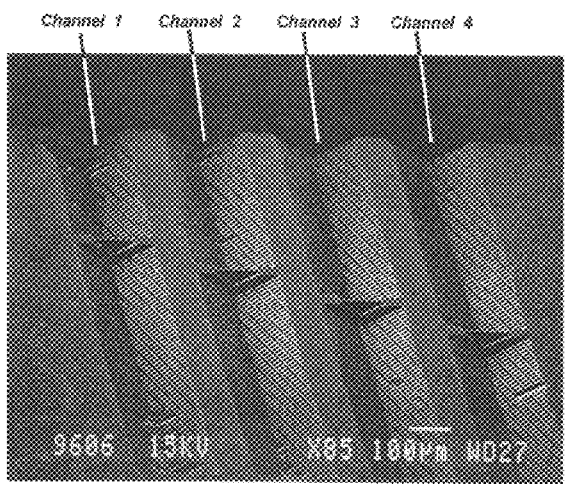
FIG. 18 is a SEM photograph of the four-channel array with four vertical micro membranes.
Figure 19:
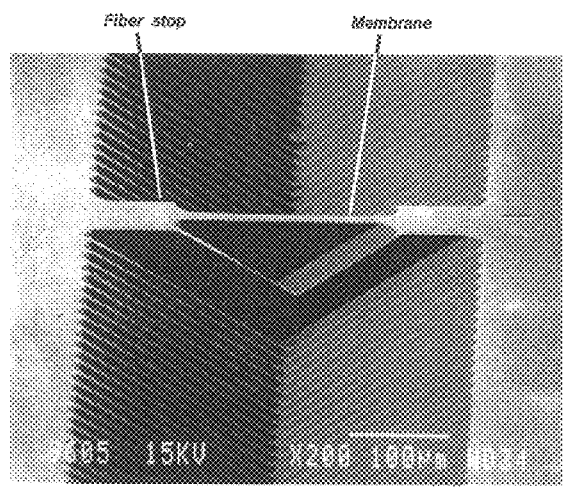
FIG. 19 is a SEM photograph of the close-up view of a micro membrane, fiber stops and the cavities.

After the SiO$_2$ etching, the substrate is rinsed thoroughly in deionized water for more than 10 minutes before spin drying. The sample is now ready for multi layer thin film deposition to form the miniature narrow band pass filters for DWDM applications. FIG. 18 shows a micro machined Si sample with four vertical micro membranes of 10 micrometer thickness, fiber stops and V-shaped cavities to accommodate the fibers. FIG. 19 is a close-up view of one of the vertical Si micro membranes, the fiber stops and part of the cavities.

Figure 20:
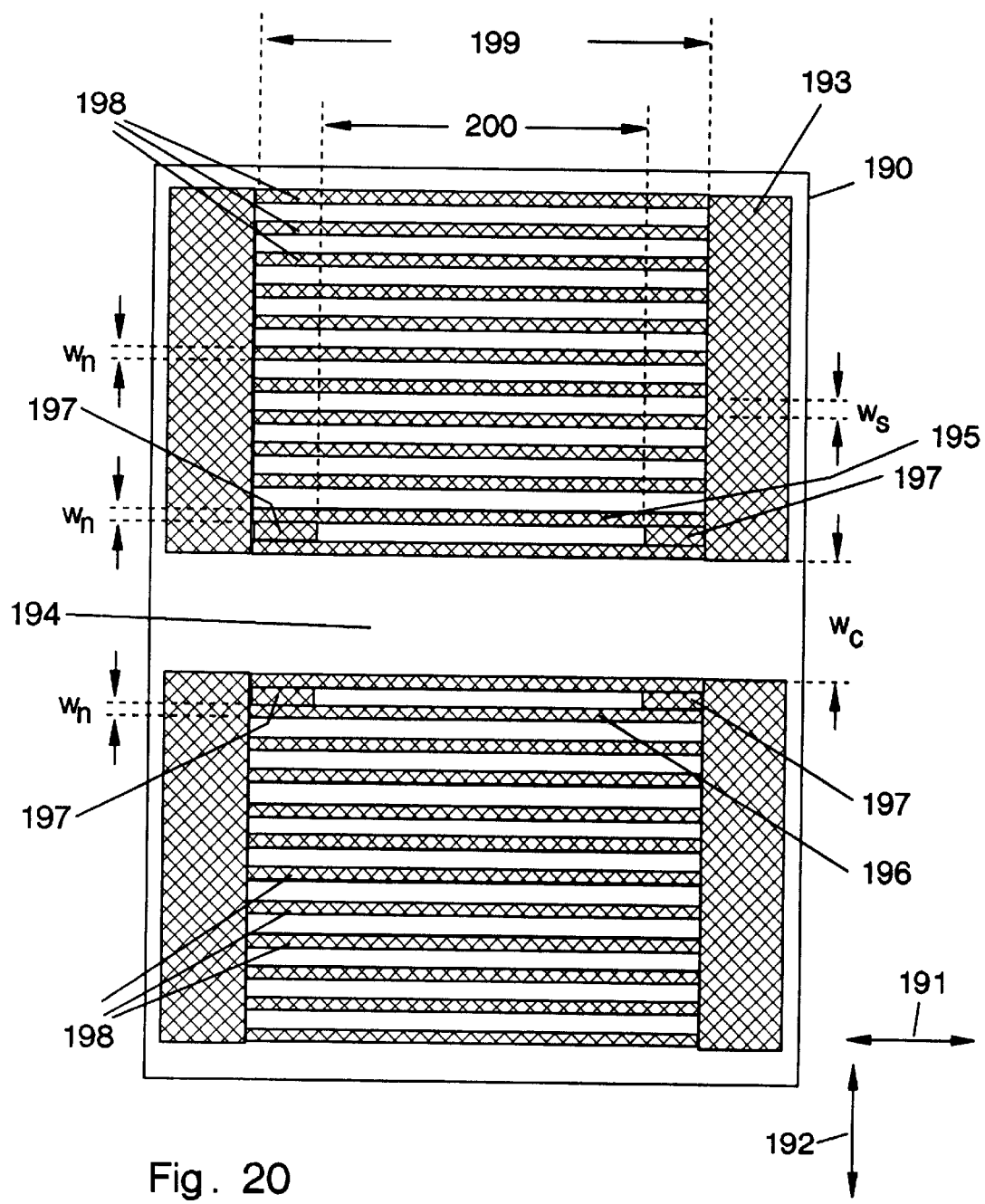
FIG. 20 is a schematic diagram of the {110} oriented Si substrate and the mask patterns used to create a cavity for variable narrow band pass filter and cavities for the fibers.

The fabrication of substrate structure for the multi channel integrated array with a variable narrow band pass filter may also be achieved using the process described in the above example. Of cause the mask patterns used will have to be modified. For example, FIG. 20 shows a mask pattern which is similar to the one shown in FIG. 17 except that the central shaded strip (194 in FIG. 17) has been replaced by an unshaded strip with a width of ($w_m$-2$w_n$). The unshaded strip may extend from one side of the substrate to the other side. After the etching, a slot with a width slightly greater than ($w_m$-2$w_n$) may be formed for the accommodation of variable narrow band pass filter.

After the presentation of the Example on the micromachining of Si substrates, another embodiment of the present invention to construct a WDM will be described. In this embodiment, a WDM for optical signal processing and multi-channel optical communications is constructed by installing miniature narrow band pass filters in a micro machined Si holder. Miniature narrow band pass filters with different central wavelengths of transmission are cut from different filters. These miniature narrow band pass filters are installed in a Si holder which is micro machined by the anisotropic etching process described in the above example. The design of the Si holder is similar so that shown in FIG. 15 except for some changes.

Figure 21:
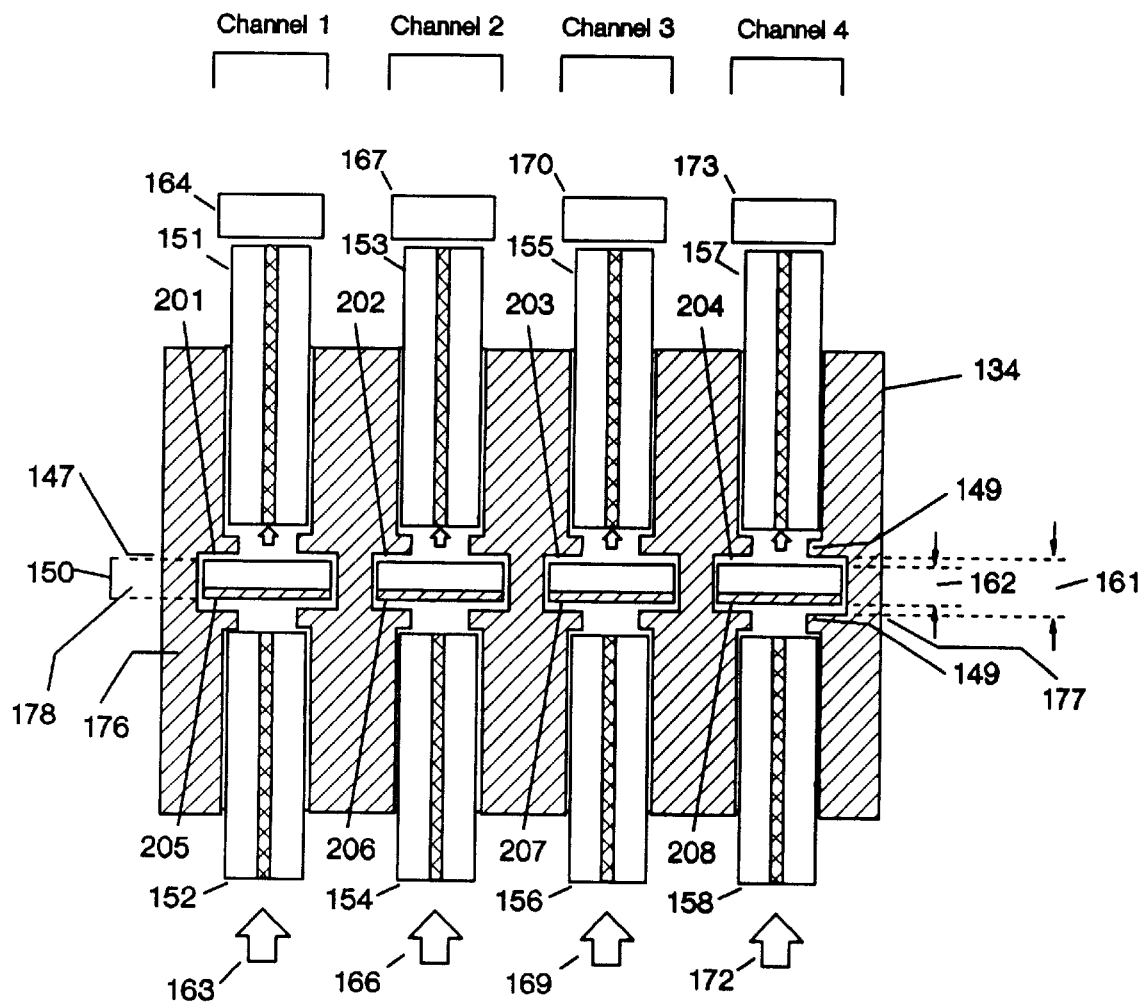
FIG. 21 is a schematic top view showing the substrate structure with four miniature narrow band pass filters and 4 pairs of fibers.

FIG. 21 shows a schematic top view of a 4-channel WDM and how the variable narrow band pass filters (205, 206, 207, 208) are located in the slots (201, 202, 203, 204) and how the fibers (151, 152, 153, 154, 155, 156, 157, 158) are located in the cavities of a micro machined substrate (134). The central wavelength of the miniature narrow band pass filter (205) is $\Omega_1$, the central wavelength of the miniature narrow band pass filter (206) is $\Omega_2$, the central wavelength of the miniature narrow band pass filter (207) is $\Omega_3$ and the central wavelength of the miniature narrow band pass filter (208) is $\Omega_4$. Value of each of the above filters is selected by controlling the thicknesses of thin film layers during the deposition. The substrates used for the filters will have to be transparent to the light beams for the optical signal transmission.

After the deposition, miniature narrow band pass filters are cut from the substrates into dimensions which are slightly smaller than that for the slots (201, 202, 203, 204). After installing one miniature narrow band pass filter in each slot, fibers (151, 152, 153, 154, 155, 156, 157, 158) are inserted in the cavities. Finally a cover (not shown in FIG. 21) is aligned on top the substrate (134) and adhesive epoxy is applied around the edges of the substrate and cover to complete the fabrication.

Thickness of the slots (161) is selected to be greater than the thickness of the miniature narrow band pass filters (162). This will allow a miniature narrow band pass filter to be inserted into each slot. Since the central wavelength of transmission of each miniature narrow band pass filter does not vary with position, there is no need to fine tune the position. After the insertion of all four miniature narrow band pass filters into the slots, installing the fibers and cover, the fabrication of the WDM is complete. At the slot end of each cavity, there are two fiber stops (149) which ensure a minimum distance between each fiber end and the miniature narrow band pass filter and prevent the fibers from touching the variable narrow band pass filter to be inserted.

In addition to the above, a micro lens may be formed at one end of each fiber to collimate the light beams in order to increase the coupling efficiency. To improve further the coupling efficiency between the two fibers in each channel, index matching material may be applied to the space between the filter and the end of fiber.

Since the central wavelength of transmission of each miniature narrow band pass filter is controlled separately during the multilayer thin film deposition, it is not required to have precise control of the separation between adjacent slots. The only requirement is to align the normal of each miniature narrow band pass filter to the long axes of fibers. When light beams (163, 166, 169, 172) are incident on the fibers of the complete WDM, only the beam with a wavelength of $\Omega_1$ will pass through the filter (205) and then through the fiber (151) to reach the detector (164). The beam with a wavelength of $\Omega_2$ will pass through the filter (206) and then through the fiber (153) to reach the detector (167). The beam with a wavelength of $\Omega_3$ will pass through the filter (207) and then through the fiber (155) to reach the detector (170). The beam with a wavelength of $\Omega_4$ will pass through the filter (208) and then through the fiber (157) to reach the detector (173).

The foregoing description is illustrative of the principles of the present invention. Numerous extensions and modifications thereof would be apparent to the person skilled in the art. Therefore, all such extensions and modifications are to be considered to be within the scope and spirit of the present invention.

What is claimed is:

1. A method for manufacturing an integrated array of miniature narrow band pass filters for optical signal processing and multichannel optical communications within a range of optical wavelengths comprising the steps of:

forming a plurality of micromembranes and a plurality of cavities on a substrate having one reference edge, with at least one cavity located at one side and at least one cavity located on the opposite side of each of said micromembranes, distance between main surface of said micromembranes and said reference edge increasing in one direction, mourning said substrate in a vacuum deposition system having a deposition source, with main surface of said micromembranes perpendicular to the normal line of said deposition source, depositing a plurality of multilayer narrow band pass filters on said main surface of said micromembranes with the central wavelength of transmission varying from one filter to another, the difference between adjacent filters defining a wavelength spacing, said micromembranes and associated cavities forming an optical channel, mounting a top cover on said substrate, and inserting an optical fiber in each of said cavities.

2. A method for manufacturing an integrated array of miniature narrow band pass filters as defined in claim 1, further comprising a step of forming two fiber stops on each side of said micromembranes, distance between leading end of said fiber and said micromembranes is controlled by thicknesses of said fiber stops.

3. A method for manufacturing an integrate array of miniature narrow band pass filters as defined in claim 1, wherein said micromembranes are transparent to light beams at wavelengths within said range of optical wavelengths.

4. A method for manufacturing an integrated array of miniature narrow band pass filters as defined in claim 1, wherein said micromembranes and said cavities are formed by micromachining of said substrate.

5. A method for manufacturing an integrated array of miniature narrow band pass filters as defined in claim 1, wherein said wavelength spacing is regulated by controlling the distance between the main surfaces of adjacent micromembranes supporting said filters.

6. A method for manufacturing an integrated array of miniature narrow band pass filters as defined in claim 1, wherein the central line of said main surface for each of said micromembranes is aligned with the long axes of the corresponding cavities.

7. A method for manufacturing an integrated array of miniature narrow band pass filters as defined in claim 1, further comprising a step of adding an index matching material in regions between said micromembranes and said optical fibers to improve optical coupling efficiency.

8. A method for manufacturing an integrated array of miniature narrow band pass filters as defined in claim 1, further comprising a step of forming a microlens on one end of each fiber facing said micromembranes to improve the optical coupling efficiency.

9. A method for manufacturing an integrated array of miniature narrow band pass filters as defined in claim 1, wherein said top cover is transparent to light beams in the 380 nm to 900 nm wavelength range.

10. A method for manufacturing an integrated array of miniature narrow band pass filters as defined in claim 1, further comprising a step of adjusting normal lines of said micromembranes with respect to said normal line of deposition source in order to minimize interference of incident evaporants by edge of said substrate.

11. A method for manufacturing a multichannel integrated array with a variable narrow band pass filter for optical signal processing and optical communications within a range of optical wavelength comprising the steps of;

forming a variable narrow band pass filter on a transparent substrate with central wavelength of transmission increasing continuously from a first wavelength value to another value in one direction, said variable narrow band pass filter is deposited on said substrate with the normal of the variable narrow band pass filter making an angle with the normal of the deposition source so that thickness of each layer decreases in one direction, forming a rectangular slot to accommodate said variable narrow band pass filter and a plurality of cavities on a substrate having one reference edge, with at least one cavity located on one side and at least one cavity located on the opposite side of said slot, positioning said variable narrow band pass filter in said slot of said substrate, wherein the normal line of said variable narrow band pass filter is aligned with the long axes of corresponding cavities, mounting a top cover on said substrate, inserting an optical fiber in each of said cavities, sending a monochromatic light beam at said first wavelength to a fiber in a first cavity, adjusting position of said variable narrow band pass filter until optical output from another fiber in said first cavity is maximum, and applying epoxy at two ends of said narrow band pass filter to fix its position with respect to said substrate.

12. A method for manufacturing a multichannel integrated array as defined in claim 11, further comprising a step of forming two fiber stops on each cavity, said fiber stops being immediately adjacent to said slot, distance between leading ends of said fibers and said narrow band pass filter is controlled by thicknesses of said fiber stops.

13. A method for manufacturing a multichannel integrated array as defined in claim 11, wherein wavelength spacing is regulated by controlling the distance between the central lines of the adjacent cavities for the accommodation of said fibers.

14. A method for manufacturing a multichannel integrated array as defined in claim 11, further comprising a step of forming a microlens on one end of each fiber facing said variable narrow band pass filter to improve the optical coupling efficiency.

15. A method for manufacturing a multichannel integrated array with discrete miniature band pass filters for optical signal processing and optical communication within a range of wavelengths comprising the steps of:

forming on transparent substrates a plurality of variable multilayer miniature narrow band pass filters each with one central wavelength of transmission, forming a plurality of rectangular slots to accommodate said miniature narrow band pass filters and a plurality of cavities on a substrate having one reference edge, with at least one cavity located on one side and at least one cavity located on the opposite side of each said slot, and two fiber stops on each cavity, said fiber stops being immediately adjacent to said slot, positioning said variable multilayer miniature narrow band pass filter in each said slot of said substrate, mounting a top cover on said substrate, inserting an optical fiber in each of said cavities, applying epoxy at two ends of said variable multilayer miniature narrow band pass filter to fix its position with respect to said substrate.

16. A method for manufacturing a multichannel integrated array as defined in claim 15, further comprising a step of forming a microlens on one end of each fiber facing the corresponding variable multilayer miniature narrow band pass filter to improve the optical coupling efficiency.

* * * * *